US012696850B2

(12) United States Patent
    El Qomri et al.

(10) Patent No.: US 12,696,850 B2
(45) Date of Patent: Aug. 4, 2026

(54) METHOD FOR CONTROLLING A LIGHTING DEVICE FOR PROMOTING THE GROWTH OF A PLANT

(71) Applicant: ROUGE ENGINEERED DESIGNS, Lyons (FR)

(72) Inventors: Yassine El Qomri, Lyons (FR); Louis Golaz, Nantes (FR)

(73) Assignee: ROUGE ENGINEERED DESIGNS, Lyons (FR)

( * ) Notice: Subject to any disclaimer, the term of this patent is extended or adjusted under 35 U.S.C. 154(b) by 0 days.

(21) Appl. No.: 18/838,500

(22) PCT Filed: Feb. 14, 2023

(86) PCT No.: PCT/FR2023/050199
     § 371 (c)(1),
     (2) Date: Sep. 30, 2024

(87) PCT Pub. No.: WO2023/156732
     PCT Pub. Date: Aug. 24, 2023

(65) Prior Publication Data
     US 2025/0151664 A1      May 15, 2025

(30) Foreign Application Priority Data
     Feb. 16, 2022    (FR) ...................................... 22/01351

(51) Int. Cl.
     *A01G 7/04*          (2006.01)
     *A01G 9/24*          (2006.01)
(52) U.S. Cl.
     CPC ............. *A01G 7/045* (2013.01); *A01G 9/249* (2019.05)
(58) Field of Classification Search
     CPC ................................ A01G 9/249; A01G 7/045
     See application file for complete search history.

(56) References Cited

U.S. PATENT DOCUMENTS 8,760,077 B2    6/2014  Jiang
10,512,221 B2   12/2019  Wells
                    (Continued)

FOREIGN PATENT DOCUMENTS

EP        1574126 A1      9/2005
EP        2172097 A1      4/2010
                    (Continued)

OTHER PUBLICATIONS

International Search Report for Application No. PCT/FR2023/050199, dated May 25, 2023, 2 pages, English translation.

(Continued)

*Primary Examiner* — Monica L Perry
(74) *Attorney, Agent, or Firm* — CANTOR COLBURN LLP

(57)                    ABSTRACT

A method for controlling an artificial lighting device arranged to produce radiation which promotes the growth of a plant includes at least: sets of primary and secondary lighting units arranged to produce primary and secondary radiation in primary and secondary wavelength bands, respectively, the radiation produced resulting from the combination of the primary and secondary radiation. The method includes obtaining a spectral energy distribution of the radiation produced by the device and received by the plant; determining, over a wavelength band having at least primary and secondary wavelength bands, a spectral energy distribution of a total radiation; obtaining at least one target model of the spectral energy distribution of the total radiation; and determining at least one command intended for the device on the basis of the spectral energy distribution of the total radiation, the target model and the spectral energy distribution of the radiation produced by the device.

20 Claims, 7 Drawing Sheets

(56)                    References Cited

U.S. PATENT DOCUMENTS

| 10,743,379 | B2 | 8/2020 | Dodson et al. |
| 11,212,970 | B1 | 1/2022 | Earlenbaugh |

FOREIGN PATENT DOCUMENTS

| EP | 2129212 | B1 | 1/2016 |
| EP | 3018997 | B1 | 3/2019 |
| EP | 3654738 | A1 | 5/2020 |
| EP | 3169147 | B1 | 8/2021 |
| FR | 3042382 | A1 | 4/2017 |

OTHER PUBLICATIONS

Written Opinion for Application No. PCT/FR2023/050199, dated May 25, 2023, 4 pages, English translation.

[Fig.1]
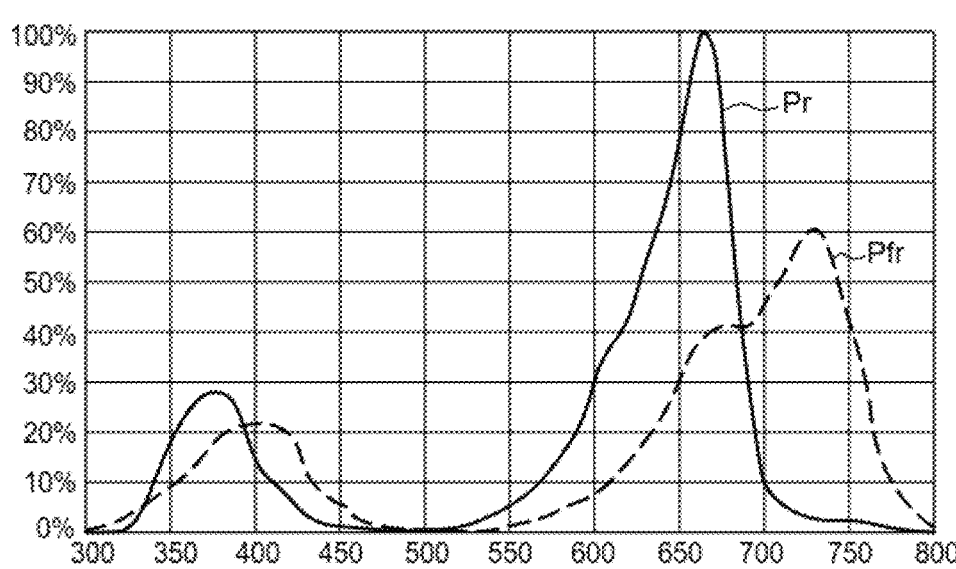
[Fig.2]
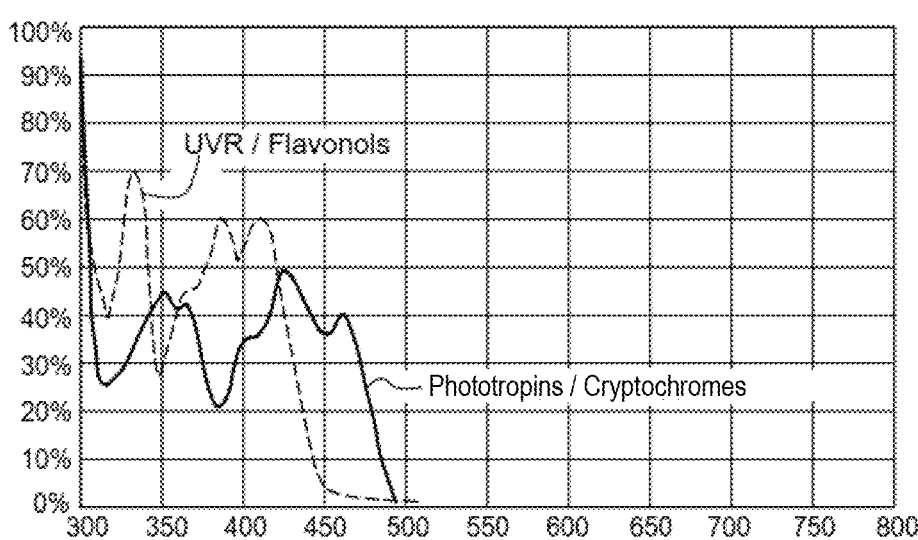

[Fig.3]
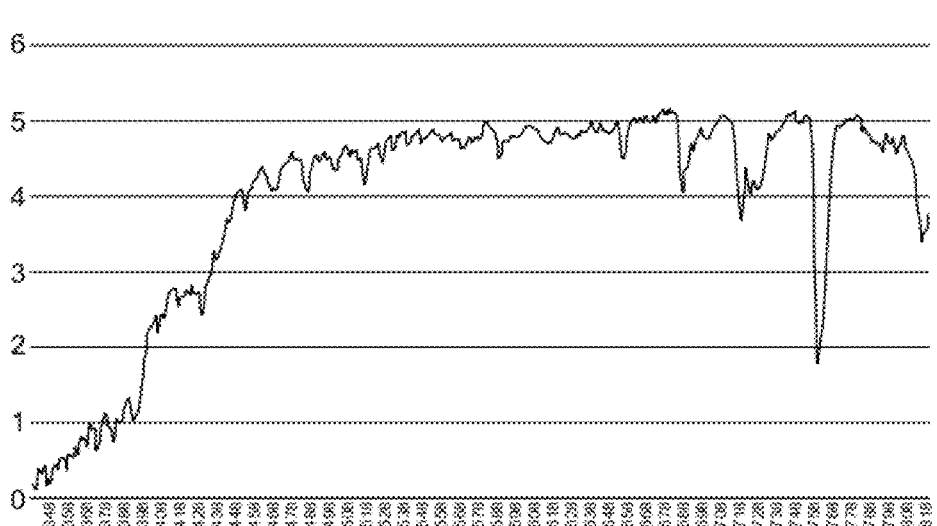
[Fig.4]
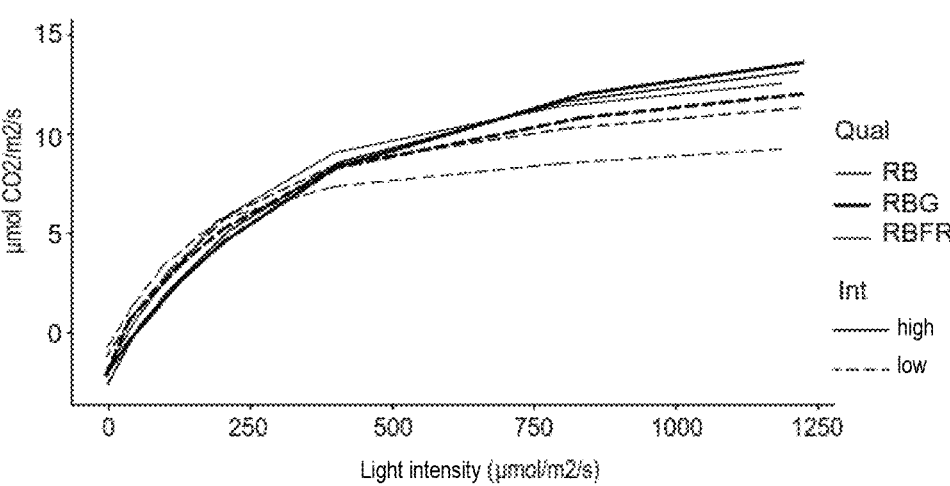

[Fig.5]
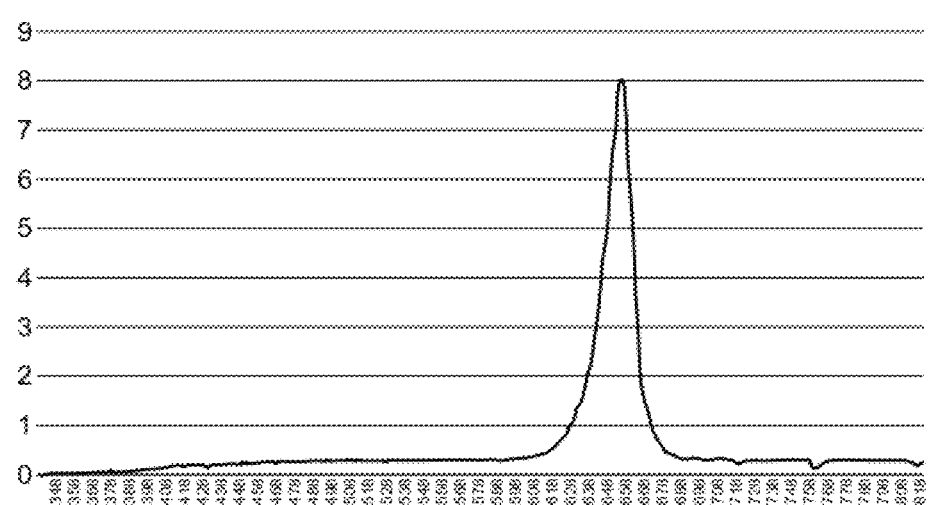
[Fig.6]
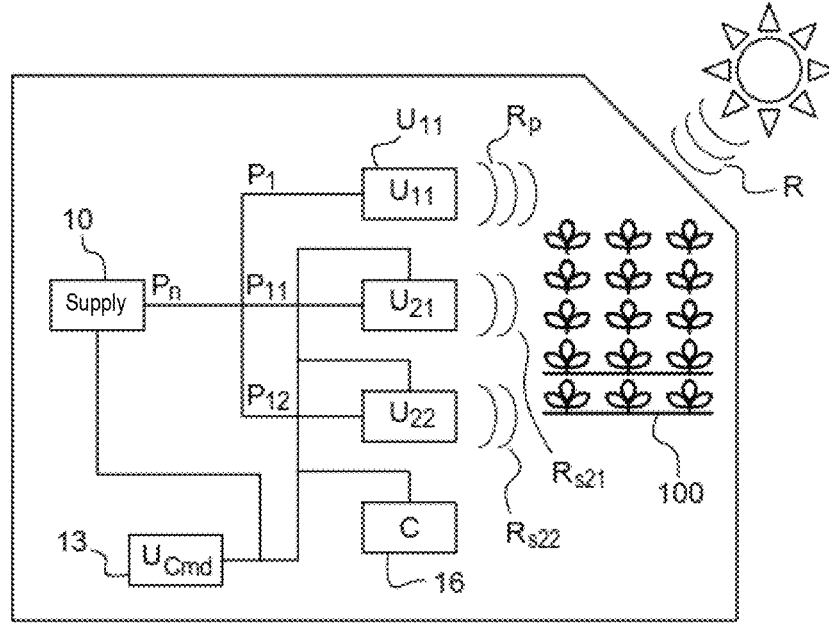

[Fig.7a]
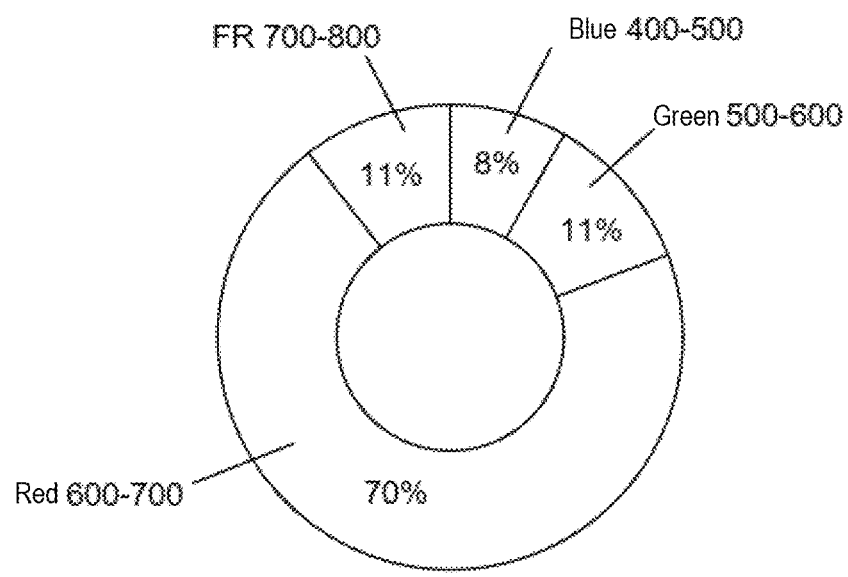
[Fig.7b]
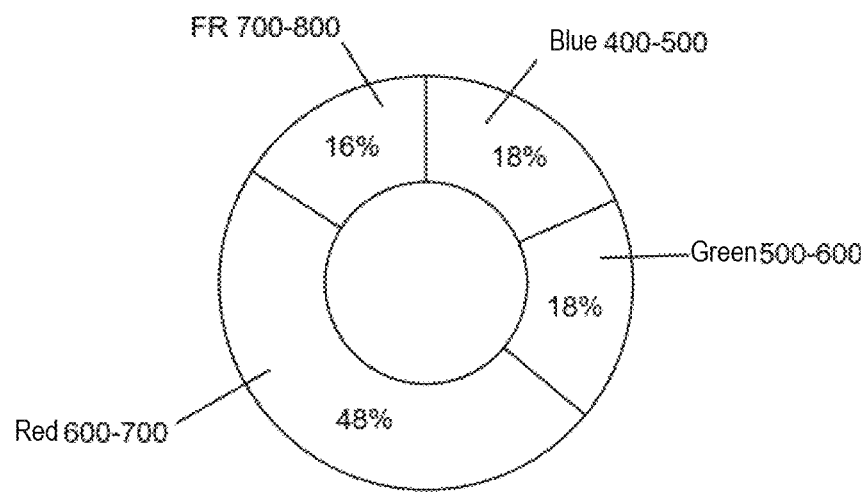

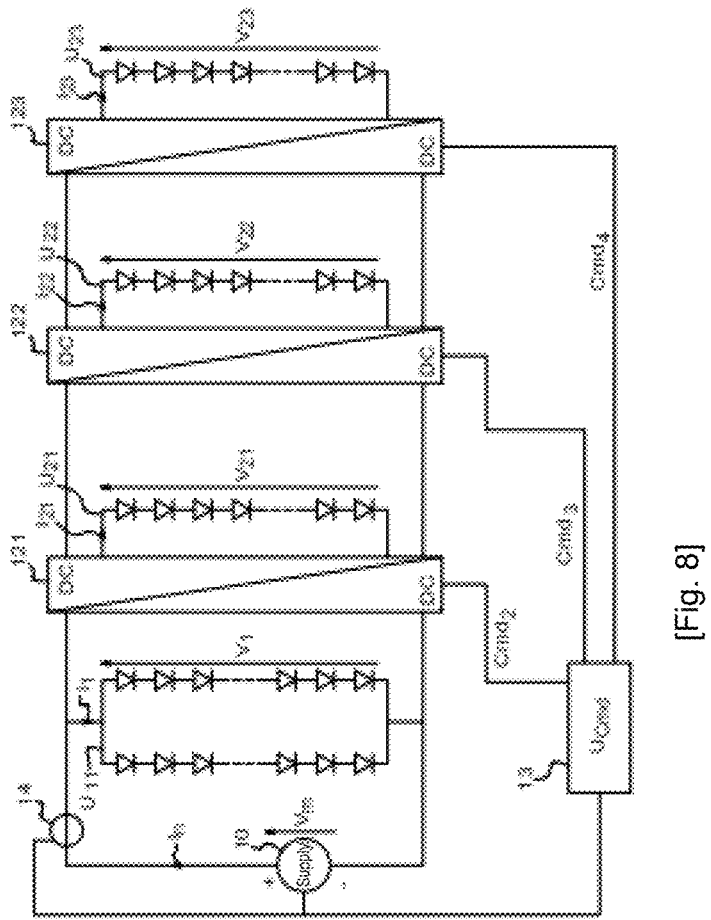
[Fig. 8]

[Fig.9]
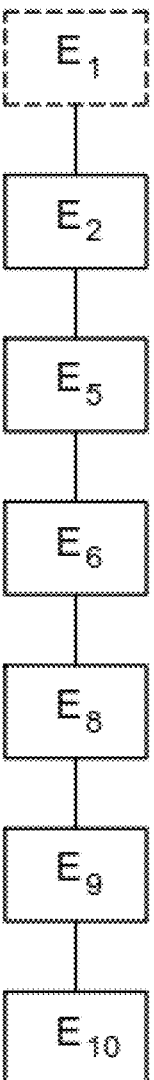

[Fig.10]
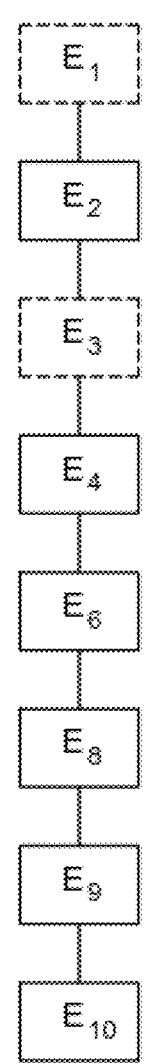

METHOD FOR CONTROLLING A LIGHTING DEVICE FOR PROMOTING THE GROWTH OF A PLANT

CROSS-REFERENCE TO RELATED APPLICATIONS

This application is a 35 U.S.C. § 371 National Stage patent application of PCT/FR2023/050199 filed 14 Feb. 2023, which claims the benefit of French patent application 22/01351 filed 16 Feb. 2022, the disclosures of which are incorporated herein by reference in their entirety.

TECHNICAL FIELD

The present disclosure, which belongs to the field of lighting and in particular to the field of agricultural and horticultural lighting, relates to a method for controlling an artificial lighting device intended to complement natural lighting to promote the development of a vegetable.

BACKGROUND

A vegetable cultivated indoors generally needs an additional supply of light to compensate for a lack, or even a complete absence, of natural light. This is particularly the case of a vegetable disposed in a home, in a location far from any window or in a room that does not benefit from natural-lighting. In these cases, it is necessary to artificially illuminate the vegetable, in order to allow its development, by means of adequately disposed artificial light sources.

Natural lighting relates to lighting produced by the sun, whether through solar radiation received directly and/or by diffuse solar radiation. Generally, natural lighting therefore results from the combination of the direct solar radiation and diffuse solar radiation.

A vegetable cultivated in a greenhouse benefits from natural lighting more or less close to that it would receive if it was cultivated outdoors. However, it is entirely possible, and even desirable, to complement this natural lighting, depending in particular on sunshine, with appropriate artificial lighting.

Artificial lighting relates to lighting produced or emitted by an artificial lighting device comprising at least one radiation source capable of producing radiation in at least one wavelength band.

In this case, the vegetable is subjected to global lighting consisting of a combination of the natural lighting and artificial lighting. The vegetable, with a view to carrying out the phenomenon of photosynthesis necessary for its growth, therefore has radiant energy provided by the radiation produced by this global lighting.

When it comes to photosynthesis, not all radiation is equal. The radiation useful for photosynthesis is radiation whose wavelengths range from approximately 400 to 700 nanometers (nm). This is photosynthetically active radiation (RPA). We also speak of a photosynthetically active band to designate the band ranging from 400 to 700 nm. This is a radiation corresponding to so-called white light.

Radiation received by a vegetable in a wavelength range located outside the 400-700 nm band, and in particular outside the 400-780 nm band, will be of very little use to it in terms of photosynthesis. This 400-780 nm wavelength band corresponds substantially to the visible domain, i.e., the radiation emitted in this wavelength band corresponds to the light visible to the human eye.

The level of photosynthesis carried out by a vegetable depends on the amount of light it receives. Indeed, the more intensely the vegetable is illuminated by a light source, the more it will be able to assimilate carbon dioxide in significant quantities.

Other parameters obviously have an influence on the phenomenon of photosynthesis such as for example ambient temperature, leaf temperature, ambient carbon dioxide level or even ambient humidity level. Generally and up to a certain limit corresponding to the saturation point of the vegetable, the more light it receives, the more quickly it will grow due to the effect of photosynthesis.

The saturation point of a vegetable, or saturation threshold, corresponds to the quantity of light energy received beyond which it will not assimilate more carbon dioxide. Thus, at the saturation threshold, the quantity of carbon dioxide assimilated by the vegetable reaches a ceiling which obviously depends not only on the type of vegetable concerned, i.e., on its species, its variety, its stage of cultivation but also environmental conditions. Beyond the saturation threshold, the vegetable sets up morphological mechanisms of protection and avoidance of light to the detriment of its growth, the level of photosynthesis decreases. A critical threshold will cause the death of the vegetable.

Subjecting a vegetable to a quantity of light energy greater than its saturation threshold therefore proves useless, since it is unfavorable from an economic point of view, and potentially biologically harmful. The vegetable is not capable of supporting this excess of energy and heat generated by this excess of light, and does not use it to produce biomass of interest to the farmer.

The saturation threshold, or light saturation threshold, of a vegetable is generally expressed in $\mu mol \cdot m^{-2} s^{-1}$ and designates a maximum of a density of photon flux received by the vegetable in the photosynthetically active band. The saturation threshold of a vegetable therefore depends on the density of photon flux produced by the photosynthetically active radiation.

For a given vegetable, the saturation threshold corresponds to a maximum value of a number of photosynthetically active photons, expressed here in $\mu mol$, received per unit of surface, expressed in square meter ($m^2$), and per unit of time expressed in second.

To promote intensive cultivation, i.e., to obtain maximum production of the vegetable cultivated in a short time, it is possible to have artificial lighting allowing, at any time, adequately complementing the natural lighting so that the global lighting, combining natural lighting and artificial lighting, produces in the photosynthetically active band a photon flux density which is both maximum and strictly less than the saturation threshold of the vegetable.

Such artificial lighting is particularly useful to compensate for the lack of sunshine in winter or on certain particularly cloudy days. Such artificial lighting can, for example, also make it possible to increase the length of the days, to provide light to the cultivated vegetable before sunrise and/or after sunset.

Natural lighting depends on factors, such as outdoor climatic conditions, period of the year or geographic location, over which the farmer has no control. If he has no control over the light intensity produced by natural lighting, the farmer equipped with an artificial lighting device must be able to influence the radiation he produces in order to compensate for a possible lack of natural lighting, with a view to achieving a target global lighting radiation, in particular a constant or variable target photon flux density, resulting from the combination of natural lighting and artificial lighting.

The target photon flux density depends in particular on the species and variety of the cultivated vegetable, the stage of development of the cultivation, the density of vegetable per square meter and also the objectives pursued by the farmer. The latter can, for example, decide to promote rapid and intensive cultivation which will only be to the detriment of the quality of the product. Conversely, the farmer can seek to obtain a vegetable with very specific characteristics which can only be obtained by subjecting it to moderate lighting during certain periods of the year, for example.

In addition, it is generally not desirable to illuminate a vegetable twenty-four hours a day because it is necessary to let it rest in the dark for at least a few hours a day. This rest phase is necessary for the translocation of sugars accumulated during the day phase. The target photon flux density is therefore generally not constant and depends on multiple factors.

Beyond purely biological considerations, the farmer is also interested in the financial and ecological cost of his vegetable production, and in particular the cost induced by the electric consumption of his artificial lighting device which can quickly become high.

To the requirements in terms of biological quantity and quality are therefore added purely economic requirements relating to the electric power consumption of the lighting device. In this context and to limit the electric consumption of the device, care should be taken, for example, to use lamps with high energy yield.

SUMMARY

In addition to the density of photon flux produced by the global lighting resulting from artificial lighting and natural lighting, another factor must be taken into consideration. This is the quality of the lighting, that is to i.e., the energy spectral distribution produced by the lighting. It is therefore important to be interested in the different frequency components of the global radiation received by the vegetable.

Generally, a vegetable is particularly sensitive to the same wavelength band as that visible to the human eye, i.e., to wavelengths ranging from approximately 400 to 780 nanometers corresponding to blue (400 to 500 nm), green (500 to 600 nm), red (600 to 700 nm) and far-red (700 to 780 nm) colors. This indeed corresponds to the photosynthetically active wavelength band. However, certain vegetable absorb, usefully and to a certain extent, often very limited, certain types of ultraviolet rays.

To ensure its development, a vegetable must therefore be exposed to a certain quantity of different types of light including UV radiation, in particular because it has different types of photoreceptors sensitive to different wavelength bands. Each photoreceptor of a vegetable, when stimulated by a light signal, causes signal transduction or signaling cascades responsible for monitoring the release of molecules acting on the growth of the vegetable and promoting the appearance of biological characteristics necessary for its survival in its environment.

The natural lighting provided by the sun, whether by direct or diffuse radiation, helps stimulate the different photoreceptors of each existing vegetable. Indeed, even if it varies depending on the time and the period of the year, the spectrum of radiation emitted by the sun remains relatively balanced and provides sufficient light energy in the different wavelength bands necessary to the growth of all vegetable.

Although it allows a certain balance and natural survival of different species, solar radiation is however not optimal in that it directs each vegetable towards particular physiological characteristics which may, for example, not correspond to what a farmer research.

In addition, the quantity and type of photoreceptors vary from one vegetable to another, and for each vegetable throughout its life. This means that each vegetable has unique needs in terms of quality of light received, and that these needs change at different stages of its development.

It is therefore insufficient and ineffective to only seek to complement natural lighting in terms of light intensity. Such a complement, although it makes it possible to compensate for a lack of natural lighting, does not make it possible to adapt the spectrum of global lighting to the particular needs of the cultivated vegetable.

The present disclosure aims to resolve all or part of the drawbacks mentioned above.

To this end, the present disclosure aims to provide artificial lighting complementary to natural lighting so that light energy received by a vegetable, resulting from the combination of natural lighting and artificial lighting, presents at any time a spectral distribution particularly suited to the vegetable to be cultivated.

Another advantage of the present disclosure is to provide artificial lighting complementary to natural lighting so that light energy received by a vegetable, resulting from the combination of natural lighting and artificial lighting, presents at any time a spectral distribution particularly suited to at least one particular goal of a farmer.

Another advantage of the present disclosure is to provide artificial lighting complementary to natural lighting so that a quantity of light energy received by a vegetable, resulting from the combination of natural lighting and artificial lighting, presents at any time an optimal value of global radiation not reaching the saturation threshold of the vegetable and promoting the phenomenon of photosynthesis to the maximum of what the vegetable is able to carry out in its environment and its state of growth.

Another advantage of the present disclosure is to provide an artificial lighting system, complementary to natural lighting, which has reasonable electric power consumption and advantageous energy yield.

The technical problem underlying the disclosure consists in particular in providing energy-efficient artificial lighting which is at the same time and at all times adapted to the sunshine conditions, the needs of the cultivated vegetable and the farmer's objectives.

An advantage of the disclosure is therefore to provide a lighting device, a lighting system, a control method and a control unit allowing these objectives to be achieved.

To this end, the subject of the present disclosure is a method for controlling an artificial lighting device arranged to produce radiation intended to promote the development of a vegetable, said device comprising at least:

A primary set of lighting units arranged to produce primary radiation in a primary wavelength band;

At least one secondary set of lighting units arranged to produce secondary radiation in a secondary wavelength band, the radiation produced by the artificial lighting device resulting from the combination of primary radiation and secondary radiation;

The control method comprising the following steps:

Obtaining an energy spectral distribution of the radiation produced by the artificial lighting device and received by the vegetable;

Determining, on a wavelength band comprising at least the primary wavelength band and the secondary wavelength band, an energy spectral distribution of global radiation resulting from the combination of artificial lighting and natural lighting and received by the vegetable;

Obtaining at least one target model of energy spectral distribution of the global radiation received by the vegetable;

Determining at least one command intended for the artificial lighting device as a function of the energy spectral distribution of the global radiation, the target model and the energy spectral distribution of the radiation produced by the artificial lighting device.

According to one possibility, said at least one command is sent to the artificial lighting device so as to modify the primary radiation and/or the at least one secondary radiation with a view to modifying the energy spectral distribution of the radiation produced by the artificial lighting device and received by the vegetable.

According to one possibility, the vegetable comprises a plant, for example a leafy plant or a flowering plant.

According to one possibility, the vegetable comprises a chlorophyll plant and/or a cereal plant and/or an oilseed plant and/or a protein plant.

According to one possibility, the vegetable comprises a viticulture plant and/or a horticulture plant and/or a lawn and/or a market gardening plant and/or a plant with roots and tubers.

According to one possibility, the vegetable comprises an aromatic plant and/or a spice plant.

According to another possibility, the vegetable comprises a tree, for example a fruit tree or a shrub.

According to another possibility, the vegetable comprises a veggie or a veggie plant.

According to another possibility, the vegetable comprises a fruit or a fruiting plant.

According to another possibility, the vegetable comprises a mushroom.

According to one possibility, the vegetable comprises a plurality of vegetable belonging to the same species.

According to yet another possibility, the vegetable comprises a plurality of vegetable of the same species belonging to the same variety.

According to one possibility, the vegetable comprises a plurality of vegetable having identical, or substantially identical, needs in terms of quality of lighting and/or quantity of lighting and/or duration of daily lighting.

According to another possibility, the vegetable comprises a plurality of vegetable having identical, or substantially identical, needs in terms of environmental conditions such as ambient temperature, leaf temperature, ambient humidity level, carbon dioxide level in ambient air . . . , etc.

According to one possibility, said artificial lighting device is intended to complement a radiation of natural lighting.

According to another possibility, said artificial lighting device is intended to be disposed in an environment devoid of natural lighting.

According to one possibility, said artificial lighting device comprises at least one incandescent lamp and/or another discharge lamp and/or halogen bulb, CMH, MH and/or a compact fluorescent bulb.

According to one possibility, said artificial lighting device comprises at least one discharge lamp, for example a sodium vapor lamp.

According to one possibility, said artificial lighting device comprises at least one high pressure sodium vapor lamp and/or an incandescent lamp and/or a discharge lamp and/or halogen bulb, CMH, MH and/or a compact fluorescent bulb.

According to one possibility, said artificial lighting device comprises at least one light-emitting diode (LED) lamp. The use of light-emitting diodes is economically advantageous, whether in terms of electric energy consumption or lifespan. Compared to other lighting solutions available on the market, a light-emitting diode in particular has high energy yield.

According to a non-limiting exemplary embodiment, the primary wavelength band is comprised between 597 and 700 nm and for example between 622 and 700 nm. According to this exemplary embodiment, the primary set of lighting units emits red color light.

According to an exemplary embodiment, the artificial lighting device comprises a single secondary set of lighting units.

According to an exemplary embodiment, the artificial lighting device comprises a plurality of secondary sets of lighting units.

According to an exemplary embodiment, the artificial lighting device comprises two secondary sets of lighting units: a first secondary set of lighting units arranged to produce a first secondary radiation in a first secondary wavelength band and a second secondary set of lighting units arranged to produce a second secondary radiation in a second secondary wavelength band.

According to an exemplary embodiment, the artificial lighting device comprises three secondary sets of lighting units: a first secondary set of lighting units arranged to produce a first secondary radiation in a first secondary wavelength band, a second secondary set of lighting units arranged to produce a second secondary radiation in a second secondary wavelength band and a third secondary set of lighting units arranged to produce a third secondary radiation in a third secondary wavelength band.

According to an exemplary embodiment, the artificial lighting device comprises four secondary sets of lighting units: a first secondary set of lighting units arranged to produce a first secondary radiation in a first secondary wavelength band, a second secondary set of lighting units arranged to produce a second secondary radiation in a second secondary wavelength band, a third secondary set of lighting units arranged to produce a third secondary radiation in a third secondary wavelength band and a fourth secondary set of lighting units arranged to produce a fourth secondary radiation in a fourth secondary wavelength band.

According to one embodiment, the primary radiation allows higher photonic efficiency and/or higher photosynthetic efficiency than secondary radiation.

The photonic efficiency of a radiation source designates the value of the ratio between the emitted photon flux expressed in $\mu mol \cdot s^{-1}$ and the electric power expressed in Watt actually consumed by the radiation source. The higher the number of photons emitted per second and per watt consumed, the better the photonic efficiency of the radiation source.

Manufacturers of lighting devices, and particularly manufacturers of agricultural and/or horticultural lighting devices, typically communicate the photonic efficiency, or photonic yield, of their products. In addition, the photonic efficiency or yield of an artificial lighting device can be measured and/or determined in situ, by varying the power consumed by the device and by measuring, for each value of consumed power, the quantity of photons emitted per second.

According to one possibility, an emission in the primary wavelength band allows a photonic efficiency greater than the photonic efficiency allowed by an emission in any secondary wavelength band.

According to one possibility, the primary wavelength band has a photonic efficiency greater than that presented by each of the secondary wavelength bands.

According to one possibility, an emission in the primary wavelength band allows a photosynthetic efficiency greater than the photosynthetic efficiency allowed by an emission in any secondary wavelength band.

According to one possibility, the primary wavelength band has a photosynthetic efficiency greater than that presented by each of the secondary wavelength bands.

According to yet another possibility, the primary wavelength band is wider than the at least one secondary wavelength band, such that the primary wavelength band comprises a wavelength range longer than the at least one secondary wavelength band. For example, the primary radiation may correspond to white light, while at least one secondary radiation corresponds to red light.

According to one possibility, the primary wavelength band and/or the at least one secondary wavelength band each comprise discontinuous wavelength ranges.

According to an exemplary embodiment, the artificial lighting device comprises at least five secondary sets of lighting units.

According to a non-limiting exemplary embodiment, at least one secondary wavelength band is comprised between 400 and 492 nm, and for example between 420 and 480 nm. According to this exemplary embodiment, at least one secondary set of lighting units emits blue color light.

According to a non-limiting embodiment, at least one secondary wavelength band is comprised between 492 and 597 nm, and for example between 492 and 577 nm. According to this exemplary embodiment, at least one secondary set of lighting units emits green color light.

According to a non-limiting exemplary embodiment, at least one secondary wavelength band is comprised between 700 and 800 nm, and for example between 700 and 780 nm. According to this exemplary embodiment, at least one secondary set of lighting units emits far-red color light.

According to a non-limiting exemplary embodiment, at least one secondary wavelength band is comprised between 380 and 740 nm, and for example between 400 and 700 nm. According to this exemplary embodiment, at least one secondary set of lighting units emits white color light. According to this exemplary embodiment, the green color, in particular, is provided by a set of polychromatic light-emitting diodes producing white color and emitting between 25 and 60% of its radiation in the green. Such a set of light-emitting diodes notably allows photonic efficiency greater than that which would be possible with a monochromatic light-emitting diode producing green light.

According to a non-limiting exemplary embodiment, at least one secondary wavelength band is comprised between 320 and 400 nm, and for example between 340 and 400 nm. According to this exemplary embodiment, at least one secondary set of lighting units emits ultraviolet (UV) radiation of the UV-A type.

According to a non-limiting exemplary embodiment, at least one secondary wavelength band is comprised between 280 and 320 nm. According to this exemplary embodiment, at least one secondary set of lighting units emits UV radiation of the UV-B type.

According to a non-limiting exemplary embodiment, at least one secondary wavelength band is comprised between 200 and 280 nm. According to this exemplary embodiment, at least one secondary set of lighting units emits UV radiation of the UV-C type.

Other primary and secondary wavelength bands are possible and conceivable. Thus, according to one possibility, at least one secondary set of lighting units can emit infrared (IR) radiation, for example of the near infrared type, which is on a wavelength band comprised between 800 nm and 1.6 μm.

According to yet another possibility, at least one secondary set of lighting units can emit infrared radiation of wavelength greater than 1.6 μm.

The photosynthetic pigments or assimilative pigments, such as chlorophylls (chlorophyll a or b), carotenoids and xanthophylls, are the chemical compounds allowing the absorption and the transformation of light energy into chemical energy in organisms performing photosynthesis. When a photon hits a photosynthetic pigment molecule, its energy excites an atom of this molecule and causes it to pass into an excited state, of high energy level. The energy accumulated in the pigment molecule is released to allow a series of oxidation-reduction reactions called photophosphorylation and the electron donor molecule then returns to its ground state.

Red light, light corresponding to radiation emitted in a wavelength band comprised between 622 and 700 nm, is the most absorbed by vegetable. This means that the radiation emitted in this wavelength band is most favorable to the photosynthesis mechanism and therefore to vegetable growth. It is also said that red light has a high rate of photosynthetic efficiency.

In particular, the type a chlorophyll has in the reds an absorption peak around 665 nm, while the type b chlorophyll has in the reds an absorption peak around 645 nm.

Blue light, light emitted in a wavelength band comprised between 420 and 480 nm, is also very well absorbed by vegetable. In particular, the type a chlorophyll has in blues an absorption peak around 430 nm, while the type b chlorophyll has in blues an absorption peak around 445 nm.

Beta-carotene, for its part, mainly absorbs only the radiation emitted in a wavelength band comprised between 400 and 500 nm corresponding to green light, and has an absorption peak around 450 nm.

According to a non-limiting exemplary embodiment, the primary wavelength band is comprised between 655 and 675 nm. According to this exemplary embodiment, the emission energy is centered on a wavelength equal to 665 nm.

According to another non-limiting exemplary embodiment, the primary wavelength band is comprised between 635 and 655 nm. According to this exemplary embodiment, the emission energy is centered on a wavelength equal to 645 nm.

According to an exemplary embodiment, at least one secondary set of lighting units emits secondary radiation on a secondary wavelength band comprised between 420 and 440 nm. According to this exemplary embodiment, the emission energy is centered on a wavelength equal to 430 nm According to an exemplary embodiment, at least one secondary set of lighting units emits secondary radiation on a secondary wavelength band comprised between 435 and 455 nm. According to this exemplary embodiment, the emission energy is centered on a wavelength equal to 445 nm.

According to an exemplary embodiment, said primary set of lighting units comprises at least one light-emitting diode.

According to one possibility, said at least one set of lighting units comprises a plurality of light-emitting diodes emitting radiation in a wavelength band comprised between 622 and 700 nm.

According to an exemplary embodiment, at least one secondary set of lighting units comprises at least one light-emitting diode.

According to one possibility, at least one secondary set of lighting units comprises a plurality of light-emitting diodes emitting a secondary radiation in a wavelength band comprised between 420 and 480 nm.

A light-emitting diode has the particularity and advantage of being capable of emitting radiation in a narrow wavelength band, for example in a band of approximately 20 nm. A light-emitting diode can therefore emit a radiation centered on a given wavelength, with a variation of approximately 10 nm on either side of this wavelength.

The use of such light-emitting diodes called chromatic or quasi-monochromatic diodes, for which the emission energy is concentrated over a narrow wavelength range, is advantageous.

Additionally, the heat generated by a light-emitting diode is moderate compared to that generated by other types of lighting. This allows better control of environmental conditions, and in particular of the ambient temperature.

According to one possibility, said primary set of lighting units comprises at least one light-emitting diode emitting light in a wavelength band comprised between 655 and 675 nm and/or a light-emitting diode emitting light in a wavelength band comprised between 635 and 655 nm.

According to another possibility, at least one secondary set of lighting units comprises at least one light-emitting diode emitting radiation in a wavelength band comprised between 420 and 440 nm and/or a light-emitting diode emitting radiation in a wavelength band comprised between 435 and 455 nm.

The use of such emission wavelength bands makes it possible to promote the phenomenon of photosynthesis, and therefore the growth and root and/or leaf development of the vegetable. This is advantageous in terms of biological productivity, since intense photosynthesis will cause the vegetable to develop quickly, correctly and in good health.

Some wavelength bands also have high radiometric efficiency compared to others. This is particularly the case of the wavelength band comprised between 622 and 700 nm, corresponding to red color. This means that a light-emitting diode emitting in the reds will produce, for one watt of electric power consumed, more light energy, and therefore greater light power, than a light-emitting diode emitting, for example, in the blues. This is inherent to the characteristics of LED technology.

Certain wavelength bands also allow, compared to others, higher quantum efficiency. This is particularly the case of the wavelength band comprised between 622 nm and 700 nm corresponding to red light. This means that a light-emitting diode emitting in the reds produces, for one watt of light power, more photons than a light-emitting diode emitting, for example, in the ultraviolet, blues or greens. This is inherent to the rules of physics and in particular to Planck's law.

According to one possibility, the primary wavelength band has a higher radiometric and/or quantum efficiency than the at least one secondary wavelength band.

According to one possibility, primary radiation allows greater radiometric and/or quantum efficiency than secondary radiation.

Each vegetable has different types of photoreceptors respectively sensitive to different wavelengths. Stimulation of the different types of photoreceptors of a vegetable is necessary to activate functions useful for its development and survival.

For example, photoreceptors sensitive to blue light generally activate functions relating to branching. Photoreceptors sensitive to UV radiation generally activate functions relating to defense, while radiation with a wavelength band comprised between 700 and 780 nm generally promotes vegetable elongation.

There are several types of photoreceptors: phytochromes sensitive to red and far-red light, phototropins sensitive to blue light, cryptochromes sensitive to blue light and UV rays, carotenoids, chloroplasts, chlorophylls.

Not all vegetable comprise the same types of photoreceptors, nor in the same quantity. Each vegetable, depending on its species and variety, therefore has particular needs in terms of lighting quality, which in terms of energy spectral distribution of the light it receives. The needs of a given vegetable also depend on its stage of maturity, and therefore change over time.

Thus, each vegetable will react differently from others to the same radiation. When cultivating a given vegetable, it is therefore important to adapt the lighting to which it is subjected.

A farmer generally sets certain objectives for the results of his cultivation. This means that he seeks to obtain a certain development of the vegetable he cultivates, with a view to obtaining a particular result. A farmer therefore seeks to adapt the quality and quantity of light received by the vegetable he is cultivating with a view to obtaining the objectives he has set for himself. The quality of the lighting received by a vegetable has a considerable influence on its growth and the type of particular characteristics that it will develop.

It is therefore advantageous to define a target model of energy spectral distribution of the radiation received by a vegetable to be cultivated, and to seek at any time to achieve this model or at least to get closer to it.

A target model of energy spectral distribution of radiation can define, for different wavelength bands, a target energy quantity to be achieved.

According to a non-limiting exemplary embodiment, a target model of energy spectral distribution of radiation, which will also be referred to as a template, may comprise a target primary photon flux density in a primary wavelength band ranging from 597 to 700 nm, a first target secondary photon flux density in a first secondary wavelength band ranging from 400 to 492 nm, a second target secondary photon flux density in a second secondary wavelength band ranging from 492 to 597 nm and a third target secondary photon flux density in a third wavelength band ranging from 700 to 780 nm.

To simplify the previous example, we can consider that the target model has in the reds a certain value of photon flux density to be achieved, in the blues a certain value of photon flux density to be achieved, in the greens a certain value of photon flux density to be achieved, and in the far-reds a certain value of photon flux density to be achieved. It is also possible to define a model where the bands corresponding to the different colors of the visible spectrum are refined, which would make it possible to achieve a certain type of red and/or a certain type of blue . . . , etc.

Of course, a target model, or template, can also define target energy quantities in other wavelength bands, for example the band comprised between 320 and 400 nm corresponding to the UV-A ray, or even a band comprising wavelengths greater than 780 nm and corresponding to the infrared domain. We understand, according to the previous example, that a template defines an absolute value of a quantity of light energy received in each band, and that this quantity of light energy represents a photon flux density expressed in $\mu mol \cdot m^{-2} \cdot s^{-1}$ According to another possibility, a template or target model may define, for each wavelength band, a relative value in the form of a percentage of a quantity of total light energy received. Using the previous example of the four wavelength bands corresponding to red, blue, green and far-red lights, we can define, as a target model, the target proportions of the amount of total light energy emitted in the band composed of the four aforementioned bands. Thus, on the band ranging from 400 to 780 nm, the template can define that the part of the total photon flux density is 60% in the reds, 20% in the blues, 10% in the greens and 10% in the far-reds.

It is advantageous to use a template defining, for each wavelength band considered and in absolute value expressed in $\mu mol \cdot m^{-2} s^{-1}$, a photon flux density. Thus, the template defines not only the target value to be achieved of a photon flux density for each wavelength band corresponding to the red, blue, green and far-red colors but also a target total value of a photon flux density over the entire photosynthetically active band, the band ranging from 400 to 780 nm corresponding to white light. Said target total value is in fact determined as the sum of the target values of photon flux density defined for each of the wavelength bands corresponding to the red, blue, green and far-red colors.

Such a template therefore makes it possible to define a total value to be achieved, on the photosynthetically active band, of the density of photon flux received by the vegetable. Whatever the energy spectral distribution of the radiation, its proportion of red, blue, green and far-red, the value defined by the template of the total density of photon flux received in the photosynthetically active band corresponds to a total value to be achieved.

Each vegetable in fact has a saturation threshold corresponding to a quantity of photosynthetically active light energy beyond which photosynthesis reaches a ceiling. For various reasons, notably biological and economic, it is not appropriate to subject a vegetable to radiation having a quantity of photosynthetically active light energy greater than its saturation threshold.

It is therefore advantageous for the total value of photosynthetically active photon flux density defined by the template to be less than the saturation threshold, and if possible to has an optimal ratio between the level of photosynthesis obtained and the cost in terms of electric consumption of the artificial lighting device.

A template is intended to be particularly adapted to a type of vegetable, i.e., to a given variety of a given species. A template may also depend on the particular goals pursued by the farmer, for example in terms of the size of a stem of a flower or the size of a leaf of a green plant.

In fact, the particular characteristics that a farmer can seek to obtain are very varied and depend in particular on the vegetable concerned. In the case of a fruit or veggie, it may be its size or even its shape, its color, its water content, its sugar level or a particular flavor.

If we know that there is a particular link between the quantity of light received by a vegetable and the characteristics it develops, the latter also depend on the quality of the light it receives, and therefore on the energy spectral distribution of the received radiation.

It is also advantageous to adapt the quantity and quality of the light received by a vegetable according to its stage of maturity. Indeed, the light requirements of a vegetable change at the different stages of its development, in particular in relation to the density of vegetable planted per square meter, to the load of the vegetable in fruit and/or flowering.

In particular, the light requirements of a fruit or veggie vegetable intended to be harvested once or twice a year change during the same year. It is therefore understood that it is advantageous to change the template throughout the year in order to adapt it as best as possible to the needs of the vegetable.

The light requirements of a cultivated vegetable can even change during the same day. Generally, it is best to let a vegetable sit in darkness, or near darkness, for a certain number of hours per day. During these periods, the template therefore has, for each covered wavelength band, a quantity of light energy equal to zero.

In addition, it may be desirable, at certain times of the day, for example at the end of the day, to subject a vegetable to intense flashes of a particular type of light, for example to flashes of UV rays, blue light, white light, red light, far-red light or even infrared radiation. These flashes make it possible in particular to trigger photomorphogenic responses in vegetable.

In addition, the template, or target model of light energy spectral distribution, may also depend on environmental conditions. In particular, the quality and/or quantity of light required by a vegetable may depend on certain environmental characteristics of the environment in which it grows.

Thus, the template can depend on the ambient temperature, the leaf temperature, the ambient humidity level or the carbon dioxide level present in ambient air. The template can therefore change over time depending on certain data received by different sensors such as a thermometer, a humidity sensor or even a carbon dioxide sensor.

It is therefore understood that the template or target model to be defined is not necessarily fixed or constant and is intended to vary according to the periods of the year, the times of day, the environmental conditions of the environment in which the vegetable is cultivated.

According to an exemplary embodiment, the step of obtaining the target model of energy spectral distribution of radiation takes into account at least one species of a vegetable and/or at least one variety.

According to an exemplary embodiment, the step of obtaining the target model of energy spectral distribution of radiation takes into account at least one element comprising: a development stage of a vegetable and/or a circadian time of a vegetable.

According to an exemplary embodiment, the step of obtaining the target model of energy spectral distribution of radiation takes into account at least one given moment of the day or night and/or at least one period of the year.

According to an exemplary embodiment, the step of obtaining the target model of energy spectral distribution of radiation takes into account at least one environmental data comprising: an ambient temperature and/or a leaf temperature and/or a carbon dioxide level in ambient air and/or an ambient humidity level.

According to an exemplary embodiment, the step of obtaining the target model of energy spectral distribution of radiation takes into account at least one particular objective related to at least one element comprising: a morphological aspect: such as a size, an internode distance, a strength of the bouquet or the stem etc . . . and/or an aspect of production quality such as: an aspect of the fruit or flower, compactness, diameter, sugar level, flavor, presence of molecules of interest etc . . . .

According to an exemplary embodiment, the target model of energy spectral distribution varies over time. In particular, the target model varies during the same year. According to another possibility, the target model varies during a calendar year.

According to an exemplary embodiment, the step of obtaining the target model of energy spectral distribution of radiation is implemented periodically.

According to an exemplary embodiment, the step of obtaining the target model of energy spectral distribution of radiation takes into account a programmed or parameterized evolution of the target model.

According to an exemplary embodiment, the step of obtaining the target model of energy spectral distribution of radiation takes into account a collection of at least one information entered.

For example, said at least one information can be entered by a farmer, or by any person duly authorized to define or modify a template.

According to one embodiment, the step of obtaining the energy spectral distribution of the radiation produced by the artificial lighting device takes into account at least one model of energy spectral distribution of radiation produced by said primary set of lighting units and/or said at least one secondary set of lighting units.

In the field of horticultural lighting, precise knowledge of some of the characteristics of the light sources used is necessary in order to guarantee their optimized use. Concerning light-emitting diodes for example, knowledge of their threshold voltage, the maximum intensity of the current that can pass through them, their global yield, the value of the photon flux emitted as a function of the electric power consumed and the emission wavelength are elements to know in order to correctly dimension on an electric level a lighting system composed of such light-emitting diodes.

These elements are generally published on the technical sheets provided by the manufacturers and it is therefore possible to take advantage of them with a view to determining the energy spectral distribution of the radiation emitted by an artificial lighting device.

The photon flux density of the radiation received by the vegetable and emitted by such an artificial lighting device also depends on other factors such as the distance of the vegetable from the light source, the total surface occupied by the vegetable to be illuminated or even the presence of a possible optical device and/or reflector making it possible to advantageously direct the photon flux towards the vegetable.

According to one possibility, the step of obtaining the energy spectral distribution of the radiation produced by the artificial lighting device takes into account at least one distance between said vegetable and said primary set of lighting units and/or said at least one secondary set of lighting units.

The density of photon flux emitted by a horticultural lamp is generally provided by the manufacturer for different distances from the source. Thus, knowing the distance between the vegetable and a light source intended for its lighting, it is possible to determine, or at least estimate the value of the photon flux density of the radiation received by the vegetable.

For certain horticultural lighting installations, it may be advantageous to carry out at least one in situ measurement of a radiation which is artificially produced and received by a vegetable in order to precisely determine the energy spectral distribution of the radiation.

According to one embodiment, the method for controlling an artificial lighting device further comprises a step of collecting at least one signal corresponding to a radiation produced by said primary set of lighting units and/or by said at least one secondary set of lighting units, the step of obtaining the energy spectral distribution of the radiation produced by the artificial lighting device then taking into account said at least one collected signal.

Apparatuses, such as a goniophotometer or a spectroradiometer, are capable of measuring a density of photon flux received at a given wavelength, or on a given wavelength band. For example, it is possible to use a device composed of a spectrometer capable of providing an energy composition of a radiation on the photosynthetically active spectrum. It is also possible to use an apparatus composed of at least one probe, such as a photodetector and/or a PARmeter, capable of measuring a quantity of photons received per square meter and per second on a given wavelength band, for example the photosynthetically active band.

From the results of measurements carried out in situ, it is possible, for a given artificial lighting device, to establish a relationship between on the one hand the density of photon flux received by a vegetable to be cultivated in each of the wavelength bands of interest and on the other hand the power consumed by each set of lighting units forming part of the installation. Establishing such a relationship may be useful with a view to allowing subsequent control of the artificial lighting device with a view to achieving a target energy spectral distribution of the radiation.

According to one embodiment, the method for controlling an artificial lighting device further comprises a step of obtaining, on a band comprising said primary wavelength band and said secondary wavelength band, an energy spectral distribution of the radiation produced by natural lighting.

Natural lighting, the natural light received on earth, for example at ground level at a given point on the earth's surface, comes from solar radiation, from radiation emitted by the sun. Natural lighting consists of directly received solar radiation and diffused solar radiation. Solar radiation is active on the entire electromagnetic spectrum, and not just on the photosynthetically active band. In addition to visible light, solar radiation comprises ultraviolet and infrared rays.

Depending on the geographical location considered, there are solar radiation maps providing, for example, the average over a year of the power of received solar radiation. There are also sunshine charts providing an average, for example a monthly, weekly or even daily average, of the power of the solar radiation received at a given point on the globe.

These charts make it possible to determine, or at least estimate, the photon flux density of the solar radiation received at a given geographic location. In other words, it is possible, from these charts, to determine or estimate a photon flux density of the radiation produced by natural lighting and received at a given point.

In addition, the spectrum of the solar radiation is known. The energy composition of the solar radiation received on earth is known. Globally, the spectrum of sunlight is relatively balanced, meaning that in the photosynthetically active band, the proportions of blues, greens, reds and far-reds are quite close to each other.

Since it depends on the relative position of the sun in the sky, the spectrum of the solar radiation changes during the year, and even during the same day, since morning or evening sunlight does not present the same energy spectral distribution as the midday sun. But this evolution is known and from this knowledge and from the sunshine charts, it is possible to determine, or at least estimate, the energy spectral distribution of the solar radiation received at any time at a point on the globe.

This means that for a given geographical location, it is possible to estimate, at any time, the absolute value of the photon flux density from the solar radiation received in each of the wavelength bands corresponding to the different red, blue, green, far-red colors. It is also possible to estimate the photon flux density of the solar radiation received in the band corresponding to UV-A rays for example.

According to one embodiment, the step of obtaining an energy spectral distribution of the radiation produced by natural lighting takes into account at least one model of energy spectral distribution of radiation of a natural lighting.

Alternatively, it is also possible to determine the energy spectral distribution of the radiation produced by the natural lighting using measurements carried out in situ using suitable apparatuses. These apparatuses are similar to those, described above, used to measure photon flux density from an artificial lighting device, and to determine its energy spectral distribution. These measuring apparatuses are known.

According to one embodiment, the step of determining the energy spectral distribution of the global radiation comprises a determination of a density of global photon flux received by said vegetable on the primary wavelength band and/or a determination of a density of global photon flux received by said vegetable on the secondary wavelength band.

According to one embodiment, the method for controlling an artificial lighting device further comprises a step of collecting at least one signal corresponding to a radiation produced by the natural lighting, the step of obtaining the energy spectral distribution of the radiation produced by the natural lighting then taking into account said at least one collected signal.

According to one embodiment, the step of determining the energy spectral distribution of the global radiation takes into account the energy spectral distribution of the radiation produced by the artificial lighting device.

According to one embodiment, the step of determining the energy spectral distribution of the global radiation takes into account the energy spectral distribution of the radiation produced by the natural lighting.

The global radiation is the product of the combination of the received artificial lighting and the natural lighting. If we obtain on the one hand the energy spectral distribution of the radiation produced by the artificial lighting device and received by the vegetable, and on the other hand the energy spectral distribution of the radiation produced by the natural lighting and received by the vegetable, it is possible to determine the energy spectral distribution of the global radiation received by the vegetable.

For each wavelength band considered, the photon flux density of the global radiation received by the vegetable is in fact the sum of the photon flux density of the radiation produced by the artificial lighting and received by the vegetable and the photon flux density of the radiation produced by the natural lighting and received by the vegetable.

Alternatively, it is possible to carry out a measurement using appropriate apparatuses, as was presented for the radiation produced by the artificial lighting and the radiation produced by the natural lighting, of the density of photon flux received by the vegetable, for example on the entire photosynthetically active band and/or on each of the wavelength bands corresponding to the red, blue, green, far-red colors.

According to one embodiment, the method for controlling an artificial lighting device further comprises a step of collecting at least one signal corresponding to the global radiation received by the vegetable, the step of determining the energy spectral distribution of the global radiation taking into account said at least one collected signal.

According to one embodiment, the control method comprises a step of comparison between the target model and the energy spectral distribution of the global radiation, the step of determining at least one command taking into account at least one difference between the target model and the energy spectral distribution of the global radiation, the command aiming to reduce said difference taking into account the energy spectral distribution of the radiation produced by the artificial lighting device.

Having determined, for each wavelength band considered, the global photon flux density of the global radiation received by the vegetable, it is then possible to compare this determined value to the value of a defined target photon flux density by the target model or template. Such comparisons make it possible to detect the presence of a possible difference, for at least one of the wavelength bands considered, between the value of the global photon flux density of the global radiation received and the target value defined in the template.

According to one possibility, the at least one command is sent to the artificial lighting device so as to modify at least one of the primary or secondary radiations produced in order to reduce or increase the quantity of photons emitted by the primary set of lighting units and/or the at least one secondary set of lighting units. Consequently, the at least one command is determined so as to reduce or increase the density of photon flux produced by the artificial lighting and received by the vegetable in at least one of the primary or secondary wavelength bands.

According to one embodiment, the comparison step comprises a comparison, at a target primary photon flux density, of said density of global photon flux received by the vegetable on the primary wavelength band and/or a comparison, at a target secondary photon flux density, of said density of global photon flux received by the vegetable on the secondary wavelength band.

Following detection of at least one difference between a photon flux density of the global radiation received by the vegetable in one of the wavelength bands considered, the step of determining said at least one command then takes into account such a difference and the command aims to reduce, and tends to eliminate, said difference.

According to one embodiment, the target model, or template, is configured to change over time as a function of different parameters, the step of obtaining at least one target model taking into account at least one element among:

A development stage of the vegetable;
One hour of the day;
An ambient temperature;
A leaf temperature;
An absence of natural lighting;
A carbon dioxide level in ambient air;
An ambient humidity level.

According to one possibility, the step of obtaining said at least one target model is implemented periodically, in order to allow possible evolution of the target model to be taken into account over time. As explained, the target model can vary throughout a year, and even during the same day to take into account certain lighting needs at particular times, for example at the end of the day or during the night.

According to one possibility, the evolution of the target model, or template, is programmed and the step of obtaining the target model takes this programmed evolution into account. The step of obtaining the target model comprises a sub-step of comparison between the target model currently used and the target model programmed to be used at the time of carrying out said comparison sub-step. The step of obtaining the target model then comprises a second sub-step of updating the target model in the event of a mismatch between the target model in use and the programmed target model.

According to one possibility, the step of obtaining the target model is updated regularly, several times per day. For example, the step of obtaining the target model is carried out every hour.

According to one possibility, the step of obtaining an energy spectral distribution of the radiation produced by the artificial device is implemented after each reception of a command intended for the artificial lighting device and aimed at modifying the energy spectral distribution of the radiation produced by the artificial lighting device. Thus, the energy spectral distribution of the radiation produced by the artificial lighting device is known at all times.

According to a second aspect, the present disclosure relates to a control unit configured to control an artificial lighting device arranged to produce radiation intended to promote the development of a vegetable, said device comprising at least:

One primary set of lighting units arranged to produce a primary radiation in a primary wavelength band;

At least one secondary set of lighting units arranged to produce a secondary radiation in a secondary wavelength band;

The control unit being capable of implementing the control method described above.

The control unit has at all times the target model of energy spectral distribution of the global radiation. Furthermore, each time the control unit determines and sends a command intended to modify the radiation of the artificial lighting device, the step of obtaining the energy spectral distribution of the radiation produced by the artificial lighting device is implemented.

During the same day, the radiation produced by the natural lighting, the direct and diffuse solar radiation received in a given geographical location, constantly changes. Thus, the step of obtaining an energy spectral distribution of the radiation produced by the natural lighting can be implemented at a certain frequency making it possible to obtain the most precise energy spectral distribution possible.

According to one possibility, the step of obtaining an energy spectral distribution of the radiation produced by the natural lighting is implemented every minute in the presence of a natural lighting. This means that in the absence of natural lighting, and in particular at night, it is not necessary to implement said obtaining step given that the radiation produced by the natural lighting is then zero or substantially zero.

If the energy spectral distribution of the radiation produced by the natural lighting is only obtained based on a sunshine model or chart, the frequency with which the step of obtaining the energy spectral distribution of the radiation produced by the natural lighting is implemented depends on the degree of precision provided by said model or chart.

According to one possibility, the step of obtaining an energy spectral distribution of the radiation produced by the natural lighting is implemented once per hour, or once every two hours.

The energy spectral distribution of the global radiation depends on both natural lighting and artificial lighting. Depending on the method used to obtain it, for example by direct measurement or by calculations performed from models and charts, it is advantageous to adapt the frequency with which the step of obtaining the energy spectral distribution of the global radiation is carried out. Furthermore, each time the radiation produced by the artificial lighting device is modified following the sending of a command from the control unit, the energy spectral distribution of the global radiation is modified.

According to one possibility, the step of obtaining the energy spectral distribution of the global radiation is implemented after each sending of a command from the control unit to the artificial lighting device.

According to one possibility, the step of obtaining the energy spectral distribution of the global radiation is carried out once every minute. According to this possibility, the step of comparison between the target model and the energy spectral distribution of the global radiation is also carried out every minute.

Such a frequency makes it possible to adapt the radiation produced by the artificial lighting device so that the global radiation received by the vegetable is as close as possible to the defined template.

According to another possibility, the step of obtaining the energy spectral distribution of the global radiation is carried out once per hour.

The control unit therefore has at all times the target model, the energy spectral distribution of the global radiation, and the energy spectral distribution of the radiation produced by the artificial lighting device. It is therefore capable of determining the commands intended for the artificial lighting device based on these three information.

The present disclosure also concerns a lighting system comprising at least:

One control unit;

One artificial lighting device arranged to produce radiation intended to promote the development of a vegetable, said at least one device comprising:

A primary set of lighting units arranged to produce a primary radiation in a primary wavelength band, said primary set being configured to operate with a primary electric power in an electric power range delimited by a maximum consumption primary electric power;

At least one secondary set of lighting units arranged to produce a secondary radiation in a secondary wavelength band, said secondary set being configured to operate with a secondary electric power included in an electric power range delimited by a maximum consumption secondary electric power;

An electric current supply unit arranged to provide a rated electric power included in an electric power range delimited by a maximum supply rated electric power, the power supply unit being configured to supply, in response to at least one command of the control unit, the primary set of lighting units with a primary electric power and the at least one secondary set of lighting units with a secondary electric power;

the maximum consumption primary electric power being included in a value range comprised between 90 and 100% of the maximum supply rated electric power.

According to one possibility, the maximum consumption primary electric power is included in a value range comprised between 80 and 100% of the maximum consumption rated electric power.

According to one possibility, the consumption maximum primary electric power is included in a value range comprised between 95 and 100% of the maximum consumption rated electric power.

According to one possibility, the maximum consumption primary electric power is substantially equal to 100% of the maximum consumption rated electric power.

According to one embodiment, the maximum consumption primary electric power is greater than the maximum consumption secondary electric power.

The primary set of lighting units is in fact dimensioned to operate with a maximum primary electric power greater than the maximum secondary electric power with which the at least one secondary set of lighting units can operate.

According to one possibility, the primary set of lighting units comprises a number of lighting units greater than the number of lighting units that the at least one secondary set of lighting units comprises.

According to one possibility, the primary radiation covers a wavelength band wider than the secondary radiation.

According to one embodiment, the primary radiation allows higher photonic efficiency and/or higher photosynthetic efficiency than the secondary radiation.

The photonic efficiency of the primary set of lighting units is therefore greater than the photonic efficiency of the at least one secondary set of lighting units. For one watt consumed, the primary set of lighting units emits a greater quantity of photons per second than the at least one secondary set of lighting units.

The photosynthetic efficiency of the primary radiation is greater than the photosynthetic efficiency of the secondary radiation. At the same photon flux density, primary radiation therefore promotes the phenomenon of photosynthesis more than the secondary radiation.

According to one possibility, the lighting system comprises at least one electric power converter arranged so as to allow a variation of the electric power consumed by the primary set of lighting units and/or the at least one secondary set of lighting units.

According to one embodiment, the lighting system comprises at least one electric power converter arranged so as to allow a variation of the secondary electric power.

The at least one secondary set of lighting units is therefore configured to operate with a secondary electric power capable of varying under the action of an electric power converter.

According to one embodiment, the lighting system comprises:

A plurality of secondary sets of lighting units, each of said secondary sets of lighting units being arranged to produce a secondary radiation in a distinct wavelength band, each of said secondary sets of lighting units being configured to operate with a secondary electric power included in an electric power range delimited by a maximum consumption secondary electric power;

A plurality of electric power converters, each of said electric power converters being arranged so as to allow a variation of the secondary electric power consumed by a distinct secondary set of lighting units.

According to one possibility, at least one electric power converter is a power electronics circuit.

According to one possibility, at least one electric power converter is an electromechanical device.

According to one possibility, at least one electric power converter is a direct current converter capable of varying the intensity of the direct current circulating through the secondary set of lighting units.

According to one possibility, at least one electric power converter converts a direct current source from one voltage level to another different one.

According to one possibility, at least one electric power converter converts a direct voltage into another direct voltage of lower or higher value.

According to one possibility, at least one electric power converter is a DC-DC converter.

According to one possibility, the control unit is arranged to control the at least one electric power converter According to one embodiment, the control unit is arranged to control each electric power converter.

The control unit is capable of developing and sending commands to each electric power converter so as to vary the electric power consumed by each secondary set of lighting units. Said commands can have the effect of increasing and/or decreasing the voltage across each secondary set of lighting units, which ultimately makes it possible to increase and/or reduce the consumed electric power.

According to one embodiment, the control unit is arranged to control the power supply unit so as to allow a variation of the rated electric power supplied by the power supply unit.

The power supply unit provides as input to the lighting device a rated electric power which can be varied by the control unit so as to reduce and/or increase the primary electric power consumed by the primary set of lighting units and/or optionally the secondary electric power consumed by the at least one secondary set of lighting units.

According to one possibility, the power supply unit is arranged to directly supply power to the primary set of lighting units, the primary set of lighting units being connected directly to the power supply unit.

According to one embodiment, the control unit comprises at least one first determination unit arranged to determine, on a wavelength band comprising at least the primary wavelength band and each secondary wavelength band, an energy spectral distribution of at least one radiation received by the vegetable.

According to one embodiment, the energy spectral distribution of the at least one radiation received by the vegetable comprises a density of photon flux received by the vegetable on the primary wavelength band, and, for each secondary wavelength band, a density of photon flux received by the vegetable on each secondary wavelength band.

According to one embodiment, the lighting system comprises at least one detection unit arranged to perform at least one measurement of a density of photon flux received by the vegetable and produced by at least one radiation on at least one wavelength band.

According to one possibility, said at least one detection unit comprises a goniophotometer and/or a spectroradiometer capable of measuring a density of photon flux received at a given wavelength, or on a given wavelength band.

According to one possibility, said at least one detection unit comprises a device provided with a spectrometer capable of providing an energy composition of a radiation on the photosynthetically active spectrum and/or an apparatus composed of at least one probe, such as a photodetector, capable of measuring a quantity of photons received per square meter and per second on a given wavelength band, for example the photosynthetically active band.

According to one embodiment, the at least one radiation received by the vegetable comprises:

A radiation produced by the artificial lighting;

A radiation produced by the natural lighting;

A global radiation resulting from the combination of the artificial lighting and natural lighting.

According to one embodiment, the first determination unit is arranged to determine an energy spectral distribution of at least one radiation received by the vegetable taking into account at least one measurement performed by the at least one detection unit.

According to one embodiment, the control unit comprises an obtaining unit arranged to obtain at least one target model of energy spectral distribution of the global radiation received by the vegetable, the obtaining unit comprising at least one second determination unit configured to determine, as a function of at least one parameter, at least one target model of energy spectral distribution of the global radiation received by the vegetable.

According to one possibility, the obtaining unit is arranged to obtain at least one target model saved in at least one memory of the control unit.

According to one possibility, the target model is capable of evolving over time.

According to one possibility, the evolution of the target model, or template, is programmed and/or parameterized in advance.

According to one possibility, the at least one second determination unit is configured to determine, as a function of at least one parameter, at least one target model of energy spectral distribution of the global radiation received by the vegetable. Said at least one parameter may comprise at least one of the following elements: a development stage of the vegetable, a time of day, an ambient temperature, a leaf temperature, an absence of natural lighting, a carbon dioxide level in ambient air, an ambient humidity level, a particular development objective, a period of the year.

According to one embodiment, the control unit comprises a comparison unit arranged to compare the energy spectral distribution of the global radiation to at least one target model, the control unit being configured to determine at least one command taking into account at least one difference between the energy spectral distribution of the global radiation and the at least one target model, said at least one command aiming at reducing said difference taking into account the energy spectral distribution of the radiation produced by the artificial lighting device.

According to one embodiment, the comparison unit is arranged to compare to a target primary photon flux density the global density of photon flux received by the vegetable on the primary wavelength band, and for each secondary wavelength band, to compare to a target secondary photon flux density corresponding to a secondary wavelength band the density of global photon flux received by the vegetable on said secondary wavelength band.

BRIEF DESCRIPTION OF THE DRAWINGS

The disclosure will be better understood using the detailed description which is set out below with reference to the appended drawings in which:

FIG. 1 is a graph showing the absorption rate of the light radiation of two types of photoreceptors present in vegetable.

FIG. 2 is a graph showing the absorption rate of the light radiation of three types of photoreceptors present in vegetable.

FIG. 3 shows, in graphic form, the spectrum of the light received on earth from the sun.

FIG. 4 shows the photosynthetic rate in tomatoes according to different types of received radiations.

FIG. 5 shows an example of spectrum of radiation emitted by a red color light-emitting diode.

FIG. 6 is a simplified block diagram of an exemplary embodiment of a lighting system according to the disclosure and its operating environment.

FIG. 7a and [FIG. 7b] represent, schematically, two examples of templates or target models of energy spectral distribution of radiation.

FIG. 8 is a diagram of an exemplary embodiment of a lighting system according to the disclosure.

FIG. 9 is a flowchart representing an exemplary embodiment of a method for controlling an artificial lighting device according to the disclosure.

FIG. 10 is a flowchart representing a second exemplary embodiment of a method for controlling an artificial lighting device according to the disclosure.

DETAILED DESCRIPTION OF THE DRAWINGS

FIG. 1 shows the curve of the absorption of light rays, as a function of the wavelength, of two types of photoreceptors: phytochromes Pr and phytochromes Pfr. As illustrated, phytochromes are photoreceptors primarily sensitive to red light and far-red color light.

Phytochromes exhibit an absorption peak at a wavelength around 665 nm, and that the absorption peak of phytochromes Pfr is located in the far-red, around the 730 nm wavelength.

Phytochromes are essential for triggering flowering for example, and monitor different functions such as the elongation of seedlings and stems, germination, photoperiodism and even chlorophyll synthesis.

Red light, and to a certain extent far-red light, are therefore essential for vegetable development and allow high absorption rates. In addition and as previously explained, a lamp emitting red light, for example a monochromatic light-emitting diode centered on a wavelength located in the reds, has high photonic efficiency.

When developing an artificial lighting program to promote the development of a vegetable, it therefore seems advantageous to favor lamps emitting red light, both for economic and biological reasons.

FIG. 2 shows the curve of the absorption of light rays, as a function of the wavelength, of phototropins and cryptochromes on the one hand, and of flavonols on the other hand.

Phototropins and cryptochromes are two types of photoreceptors present in different vegetables, and particularly green plants. As illustrated, they mainly assimilate ultraviolet radiation and blue light, up to a wavelength around 480 nm. These UV ray and blue light receptors allow the activation of essential functions in vegetables, such as stomatal function, gene activation, stem elongation, or even pigment synthesis.

Depriving a vegetable of blue light, and to a lesser extent of UV rays, would therefore be to disrupt some of the functions essential to its development.

An artificial lighting device must emit light radiation having a certain energy in the wavelengths corresponding to blue light.

At ground level, the spectrum of light emitted by the sun and received on earth is, as illustrated in [FIG. 3], globally balanced, i.e., that the sun provides, during a large part of the day, relatively uniform light energy at all wavelengths of the photosynthetically active band.

The spectrum of light emitted by the sun and received on earth varies during the same day, and throughout the year.

At certain times of the day, in particular in the early morning and at the end of the day, the light received from the sun is red, that the light energy provided by the sun is high in the wavelength bands corresponding to red and far-red, and lower in the wavelength bands corresponding to blue and green. Blue light, in particular, is filtered when the sun is low in the sky, and its rays come from the horizon.

At such times, the level of blue light received from the sun is generally no longer sufficient to meet the needs of vegetable, and it is necessary and advantageous to subject them to artificially produced radiation providing the energy they need in the wavelength bands corresponding to blue.

FIG. 4 shows the level of photosynthesis in tomatoes as a function of the type and quantity of received light. More precisely, the graph shows different evolutions of the absorption of carbon dioxide by the vegetable relative to the density of photon flux it receives. It can be seen that whatever the type of light, for example red-blue light (RB), red-blue-green light (RBG) or red-blue-far-red light (RBFR), the tomato has a saturation threshold beyond which it absorbs almost no carbon dioxide.

Each vegetable has a saturation threshold, i.e., a certain quantity of light beyond which photosynthesis stagnates. It is therefore actually not necessary to illuminate a vegetable beyond this threshold.

FIG. 5 shows an aspect of the spectrum of radiation emitted by a light-emitting diode. The wavelength band covered by the radiation of the light-emitting diode is centered on the 660 nm wavelength. The emission spectrum shown in [FIG. 5] is such that at average intensity, the covered wavelength band is around 20 nm. The disclosure makes advantageous use of this type of lighting.

FIG. 6 schematically shows an example of a lighting system according to one embodiment of the disclosure. In [FIG. 6] the lighting system comprises an artificial lighting device comprising three sets of lighting units: a primary set $U_{11}$ emitting a primary radiation $R_p$ in a primary wavelength band, a first secondary set $U_{21}$ emitting a first secondary radiation $R_{s21}$ in a first secondary wavelength band, and a second secondary set $U_{22}$ emitting a second secondary radiation $R_{s22}$ in a second secondary wavelength band.

Each of the sets of lighting units therefore respectively emits radiation towards at least one vegetable 100 in a given wavelength band, the vegetable also receiving radiation $R_n$ produced by natural lighting, by the action of solar rays received directly or by diffusion. The vegetable 100 therefore receives global radiation resulting from the combination of artificial lighting produced by the artificial lighting device and natural lighting produced by solar radiation. In the embodiment of [FIG. 6], the radiation produced by the artificial lighting device comprises a primary radiation $R_p$ and two distinct secondary radiations $R_{s21}$ and $R_{s22}$ produced respectively by the secondary set of lighting units $U_{21}$ and by the secondary set of lighting units $U_{22}$.

The lighting system comprises a power supply unit 10 capable of providing as input to the artificial lighting device a supply rated electric power $P_n$. The power supply unit is arranged to provide to the primary set of lighting units $U_{11}$ an electric power $P_1$, to the first secondary set of lighting units $U_{21}$ an electric power $P_{21}$ and to the second secondary set of lighting units $U_{22}$ an electric power $P_{22}$.

The lighting system also comprises at least one detection unit 16 capable of carrying out a collection of at least one signal representative of radiation produced by the artificial lighting device and/or by natural lighting. According to one possibility, such a detection unit 16 is a goniophotometer and/or a spectroradiometer.

The lighting system comprises a control unit 13 capable of determining and sending at least one command to the power supply unit 10 and each of the two secondary sets of lighting units $U_{21}$ and $U_{22}$.

FIG. 7a and [FIG. 7b] show two examples of templates or target models of energy spectral distribution expressing, in relative value, the densities of photon flux produced respectively by four radiations corresponding respectively to the red, green, blue and far-red colors. The two target models of FIG. 7a and [FIG. 7b] favor radiation emitted in a wavelength band corresponding to the red color, the wavelength band allowing a high photonic and/or photosynthetic efficiency.

According to another possibility, a target model of energy spectral distribution can define, for each wavelength band considered, an absolute value of target photon flux density.

FIG. 8 shows, in simplified form, a diagram of a lighting system according to one embodiment of the disclosure.

The lighting system comprises a power supply unit 10 which provides as input to an artificial lighting device a supply current $I_n$ at a voltage $V_n$. The power supply unit 10 therefore provides as input to the artificial lighting device a supply rated electric power $P_n = V_n \times I_n$. This rated electric power is comprised in an electric power range delimited by a maximum supply rated electric power: $P_{nmax} = V_{nmax} \times I_{nmax}$.

The artificial lighting device comprises a primary set of lighting units $U_{11}$ arranged to produce primary radiation in a primary wavelength band and at least one secondary set of lighting units $U_{21}$ arranged to produce secondary radiation in a secondary wavelength band.

The power supply unit 10 is arranged so as to provide to the primary set of lighting units $U_{11}$ primary electric power, and so as to provide to the at least one secondary set of lighting units $U_{21}$ secondary electric power.

In accordance with the embodiment of [FIG. 8], the power supply unit 10 is arranged to directly supply power to the primary set of lighting units $U_{11}$. The primary set of lighting units $U_{11}$ is directly connected to the power supply unit 10.

In accordance with the embodiment of [FIG. 8], the power supply unit 10 is arranged to indirectly supply power to the at least one secondary set of lighting units $U_{21}$. Thus, the at least one secondary set of lighting units $U_{21}$ is indirectly connected to the power supply unit 10. This means that at least one electrical component is connected between the power supply unit 10 and the at least one secondary set of lighting units $U_{21}$.

The primary set $U_{11}$ is traversed by a primary electric current of intensity $I_1$ and has across its terminals an electric voltage $V_1$. According to the non-limiting embodiment represented in [FIG. 8], the primary set of lighting units $U_{11}$ comprises two subsets of lighting units, said subsets being connected to each other in parallel and comprising an equivalent number of lighting units connected in series.

According to another embodiment not represented, the primary set of lighting units comprises a plurality of subsets of lighting units connected in parallel to each other and comprising an equivalent or distinct number of lighting units connected in series.

According to yet another embodiment not represented, the primary set of lighting units comprises a single set of lighting units connected in series.

The primary set of lighting units $U_{11}$ operates with a consumption primary electric power $P_1$. The primary electric power consumed by the primary set of lighting units $U_{11}$ is $P_1=V_1\times I_1$, and is comprised in an electric power range delimited by a maximum consumption primary electric power $P_{1max}=V_{1max}\times I_{1max}$.

According to one possibility, the maximum consumption primary electric power $P_{1max}$ is comprised in a value range comprised between 90 and 100% of the maximum consumption rated electric power $P_{nmax}$.

According to one possibility, the maximum consumption primary electric power $P_{1max}$ is substantially equal to 100% of the maximum consumption rated electric power $P_{nmax}$.

According to the non-limiting embodiment represented in [FIG. 8], the artificial lighting device comprises three secondary sets of lighting units $U_{21}$, $U_{22}$, $U_{23}$.

According to another embodiment not represented, the artificial lighting device may comprise two secondary sets of lighting units.

According to another embodiment not represented, the artificial lighting device may comprise a single secondary set of lighting units.

According to another embodiment not represented, the artificial lighting device may comprise a plurality of secondary sets of lighting units, for example at least four secondary sets of lighting units.

The power supply unit is arranged so as to provide to the primary set of lighting units $U_{11}$ primary electric power, and so as to respectively provide to each secondary set $U_{21}$, $U_{22}$, $U_{23}$ of the plurality of secondary sets of lighting units a given secondary electric power $P_{21}$, $P_{22}$ and $P_{23}$.

According to the non-limiting embodiment represented in [FIG. 8], each secondary set of lighting units $U_{21}$, $U_{22}$, $U_{23}$ comprises a single branch of lighting units connected in series.

According to another embodiment not represented, at least one secondary set of lighting units may comprise at least two secondary subsets of lighting units, said at least two secondary subsets being connected in parallel to each other, said at least two secondary subsets comprising a similar or distinct number of lighting units connected in series.

According to the non-limiting embodiment shown in [FIG. 8], a first secondary set of lighting units $U_{21}$ is traversed by a first secondary electric current of intensity $I_{21}$ and has across its terminals a first secondary electric voltage $V21$. The first secondary set of lighting units $U_{21}$ operates with a first consumption secondary electric power $P_{21}=V_{21}\times I_{21}$, said first consumption secondary electric power $P_{21}$ being comprised in an electric power range delimited by a first maximum consumption secondary electric power $P_{21max}=V_{21max}\times I_{21max}$.

According to the non-limiting embodiment shown in [FIG. 8], a second secondary set of lighting units $U_{22}$ is traversed by a second secondary electric current of intensity $I_{22}$ and has across its terminals a second secondary electric voltage $V_{22}$. The second secondary set of lighting units $U_{22}$ operates with a second consumption secondary electric power $P_{22}=V_{22}\times I_{22}$, said second consumption secondary electric power $P_{22}$ being comprised in an electric power range delimited by a second maximum consumption secondary electric power $P_{22max}=V_{22max}\times I_{22max}$.

According to the embodiment shown in [FIG. 8], a third secondary set of lighting units $U_{23}$ is traversed by a third secondary electric current of intensity $I_{23}$ and has across its terminals a third electric voltage $V_{23}$. The third secondary set of lighting units $U_{23}$ operates with a third consumption secondary electric power $P_{23}=V_{23}\times I_{23}$, said third consumption secondary electric power $P_{23}$ being comprised in an electric power range delimited by a third maximum consumption secondary electric power $P_{23max}=V_{23max}\times I_{23max}$.

According to one possibility, the maximum consumption primary electric power $P_{1max}$ is greater than the first maximum consumption secondary electric power $P_{21max}$.

According to one possibility, the maximum consumption primary electric power $P_{1max}$ is greater than the second maximum consumption secondary electric power $P_{22max}$.

According to one possibility, the maximum consumption primary electric power $P_{1max}$ is greater than the third maximum consumption secondary electric power $P_{23max}$.

According to one possibility, the maximum consumption primary electric power $P_{1max}$ is greater than each of the maximum consumption secondary electric powers $P_{21max}$, $P_{22max}$, $P_{23max}$.

According to one possibility, the primary set of lighting units $U_{11}$ produces primary radiation in a wavelength band different from the wavelength band in which secondary radiation is produced by the at least one secondary set of lighting units.

According to one possibility, the primary set of lighting units $U_{11}$ produces primary radiation in a wavelength band wider than the wavelength band in which secondary radiation is produced by the at least a secondary set of lighting units. The primary wavelength band therefore comprises a wider wavelength range than the secondary wavelength band.

According to one possibility, each secondary set of lighting units $U_{21}$, $U_{22}$, $U_{23}$ of the plurality of secondary sets of lighting units produces secondary radiation in a distinct wavelength band.

According to one possibility, the primary set of lighting units $U_{11}$ comprises a number of lighting units greater than the number of lighting units comprised in the at least one secondary set of lighting units $U_{21}$.

According to one possibility, the primary set of lighting units $U_{11}$ comprises a number of lighting units greater than the number of lighting units comprised respectively in each secondary set of the plurality of secondary sets of lighting units $U_{21}$, $U_{22}$, $U_{23}$.

According to one possibility, the primary radiation produced by the primary set of lighting units $U_{11}$ allows a photonic efficiency greater than the photonic efficiency allowed by the secondary radiation produced by the at least one secondary set of lighting units.

According to one possibility, the primary radiation produced by the primary set of lighting units $U_{11}$ allows a photonic efficiency greater than the photonic efficiency allowed by the secondary radiation produced respectively by each secondary set of the plurality of secondary sets of lighting units $U_{21}$, $U_{22}$, $U_{23}$.

According to one possibility, the primary radiation produced by the primary set of lighting units $U_{11}$ allows a photosynthetic efficiency greater than the photosynthetic efficiency allowed by the secondary radiation produced by the at least one secondary set of lighting units.

According to one possibility, the primary radiation produced by the primary set of lighting units $U_{11}$ allows a photosynthetic efficiency greater than the photosynthetic efficiency allowed by the secondary radiation produced respectively by each secondary set of the plurality of secondary sets of lighting units $U_{21}$, $U_{22}$, $U_{23}$.

According to one possibility, the primary radiation produced by the primary set of lighting units $U_{11}$ allows a radiometric and/or quantum efficiency greater than the photonic efficiency allowed by the secondary radiation produced by the at least one secondary set of lighting units.

According to one possibility, the at least one secondary set of lighting units and the primary set of lighting units are arranged so as to be able to be connected in parallel.

According to one possibility, the primary set of lighting units and each secondary set of the plurality of secondary sets of lighting units are arranged so as to be able to be connected in parallel.

According to the non-limiting embodiment represented in [FIG. 8], the artificial lighting device comprises at least one electric power converter 121 arranged so as to allow a variation of the secondary electric power consumed by the at least one secondary set of lighting units $U_{21}$.

According to the non-limiting embodiment represented in [FIG. 8], the artificial lighting device comprises three electric power converters 121, 122, 123. The electric power converter 121 is arranged so as to allow a variation of the secondary electric power $P_{21}$ consumed by the secondary set of lighting units $U_{21}$. The electric power converter 122 is arranged so as to allow a variation of the secondary electric power $P_{22}$ consumed by the secondary set of lighting units $U_{22}$. The electric power converter 123 is arranged so as to allow a variation of the secondary electric power $P_{23}$ consumed by the secondary set of lighting units $U_{23}$.

According to one possibility, at least one electric power converter is a DC-DC converter.

According to the non-limiting embodiment represented in [FIG. 8], each electric power converter 121, 122, 123 is a DC-DC converter.

A DC-DC converter is a switching power supply that converts a direct voltage into another direct voltage of lower or higher value.

According to one possibility, at least one electric power converter allows the application of a variation of the electric voltage across the at least one secondary set of lighting units.

According to one possibility, each electric power converter allows the application of a variation of the secondary electric voltage across the secondary set of lighting units to which it is connected.

The application of a variation of the secondary electric voltage across a secondary set of lighting units involves a variation of the secondary power consumed by said secondary set of lighting units.

According to yet another possibility, at least one electric power converter is a direct current converter capable of varying the intensity of the direct current circulating through the at least one secondary set of lighting units. Such a variation of the intensity of the direct current makes it possible to vary the electric power consumed by the at least one secondary set of lighting units.

According to the non-limiting embodiment represented in [FIG. 8], the control unit 13 is arranged so as to be able to control at least one electric power converter.

According to the non-limiting embodiment represented in [FIG. 8], the control unit 13 is arranged so as to be able to control each DC-DC converter.

According to one possibility, the control unit 13 is arranged so as to be able to control the power supply unit. According to this possibility, the control unit is arranged so as to be able to apply a variation of the rated electric power $P_n$ provided by the power supply unit.

According to the non-limiting embodiment represented in [FIG. 8], the lighting system comprises at least one current detector 14 arranged to detect an electric current of intensity $I_n$ supplied by the power supply unit 10. The current detector 14 is therefore capable of measuring the intensity $I_n$ of the rated electric current provided as input to the artificial lighting device by its power supply unit 10. The current detector 14 communicates with the control unit 13 via a wireless or wired connection, and therefore provides it at any time with the value $I_n$ of the intensity of the electric current provided by the power supply unit 10.

The control unit 13 is arranged to determine and send at least one first command cmd1 to the power supply unit 10 with a view to applying a variation of the rated electric power $P_n$ supplied by the power supply unit 10.

The command $Cmd_1$ is capable of reducing and/or increasing the rated electric power $P_n$ provided by the power supply unit 10 as input to the artificial lighting device. The command $Cmd_1$ therefore tends to reduce or increase the electric power $P_1$ consumed by the primary set of lighting units $U_{11}$. Thus, the command $Cmd_1$ has the effect in particular of reducing or increasing the number of photons emitted per second by the set of lighting units $U_{11}$, which leads to a reduction or increase in the value of the density of photon flux received by the vegetable on the primary wavelength band.

The control unit 13 is arranged to determine and send at least one second command cmd2 to the electric power converter 121 so as to apply a variation of the secondary electric power $P_{21}$ consumed by the secondary set of lighting units $U_{21}$.

The command $Cmd_2$ is capable of reducing and/or increasing the electric power $P_{21}$ consumed by the first secondary set of lighting units $U_{21}$. Thus, the command $Cmd_2$ has the effect of reducing and/or increasing the number of photons emitted per second by the first secondary set of lighting units $U_{21}$, which leads to a reduction or increase in the value of the density of photon flux received by the vegetable on the first secondary wavelength band.

The control unit 13 is arranged to determine and send at least one third command cmd3 to the electric power converter 122 so as to apply a variation of the secondary electric power $P_{22}$ consumed by the secondary set of lighting units $U_{22}$.

The command $Cmd_3$ is capable of reducing and/or increasing the electric power $P_{22}$ consumed by the second secondary set of lighting units $U_{22}$. Thus, the command $Cmd_3$ has the effect of reducing and/or increasing the number of photons emitted per second by the second secondary set of lighting units $U_{22}$, which leads to a reduction or increase in the value of the density of photon flux received by the vegetable on the second secondary wavelength band.

The control unit 13 is arranged to send at least one fourth command cmd4 to the electric power converter 123 so as to apply a variation of the secondary electric power $P_{23}$ consumed by the secondary set of lighting units $U_{23}$.

The command $Cmd_4$ is capable of reducing and/or increasing the electric power $P_{23}$ consumed by the second secondary set of lighting units $U_{23}$. Thus, the command $Cmd_4$ has the effect of reducing and/or increasing the number of photons emitted per second by the third secondary set of lighting units $U_{23}$, which leads to a reduction or increase in the value of the density of photon flux received by the vegetable on the third secondary wavelength band.

According to one possibility, the lighting system also comprises at least one detection unit 16 represented in [FIG. 6]. The detection unit 16 is arranged to collect at least one signal corresponding to radiation, hereinafter radiation signal. The detection unit 16 is capable of performing at least one measurement of the collected signal and/or one measurement related to the collected signal.

According to one possibility, the detection unit 16 is capable of measuring an emitted photon flux, expressed in $\mu mol \cdot s^{-1}$, corresponding to the radiation signal collected by the detection unit 16.

According to one possibility, the detection unit 16 is capable of measuring a received photon flux density in $\mu mol \cdot m^{-2} \cdot s^{-1}$ corresponding to the radiation signal collected by the detection unit 16. For example, the detection unit is a PARmeter.

According to one possibility, the lighting system comprises at least one detection unit 16 arranged to collect the primary radiation produced by the primary set of lighting units $U_{11}$.

According to one possibility, the lighting system comprises at least one detection unit 16 arranged to collect the secondary radiation produced by the first secondary set of lighting units $U_{21}$.

According to one possibility, the lighting system comprises at least one detection unit 16 arranged to collect the secondary radiation produced by the second secondary set of lighting units $U_{22}$.

According to one possibility, the lighting system comprises at least one detection unit 16 arranged to collect the secondary radiation produced by the third secondary set of lighting units $U_{23}$.

According to one possibility, the lighting system comprises at least one detection unit arranged to collect the total radiation globally produced by the artificial lighting device, which results from the combination of primary radiation and secondary radiations.

According to one possibility, the lighting system comprises at least one detection unit 16 arranged to collect the radiation produced by natural lighting.

According to one possibility, the lighting system comprises at least one detection unit 16 arranged to collect the global radiation resulting from the combination of artificial lighting and natural lighting.

According to one possibility, the lighting system comprises at least one detection unit 16 arranged to measure a density of photon flux received by a vegetable and corresponding to the radiation produced by natural lighting.

According to one possibility, the lighting system comprises at least one detection unit 16 arranged to measure a density of photon flux received by a vegetable and corresponding to the radiation produced by the artificial lighting device.

According to one possibility, the lighting system comprises at least one detection unit 16 arranged to measure a density of photon flux received by a vegetable and corresponding to the global radiation resulting from the combination of artificial lighting and natural lighting.

According to one possibility, the lighting system comprises at least one detection unit 16 arranged to measure a density of photon flux received by a vegetable and corresponding to the primary radiation produced by the primary set of lighting units $U_{11}$.

According to one possibility, the lighting system comprises at least one detection unit 16 arranged to measure an emitted photon flux corresponding to the primary radiation produced by the primary set of lighting units $U_{11}$.

According to one possibility, the lighting system comprises at least one detection unit 16 arranged to measure a density of photon flux received by a vegetable and corresponding to the secondary radiation produced by the first secondary set of lighting units $U_{21}$.

According to one possibility, the lighting system comprises at least one detection unit 16 arranged to measure an emitted photon flux corresponding to the secondary radiation produced by the first secondary set of lighting units $U_{21}$.

According to one possibility, the lighting system comprises at least one detection unit arranged to measure a density of photon flux received by a vegetable and corresponding to the secondary radiation produced by the second secondary set of lighting units $U_{22}$.

According to one possibility, the lighting system comprises at least one detection unit 16 arranged to measure an emitted photon flux corresponding to the secondary radiation produced by the second secondary set of lighting units $U_{22}$.

According to one possibility, the lighting system comprises at least one detection unit arranged to measure a density of photon flux received by a vegetable and corresponding to the secondary radiation produced by the third secondary set of lighting units $U_{23}$.

According to one possibility, the lighting system comprises at least one detection unit arranged to measure an emitted photon flux corresponding to the secondary radiation produced by the third secondary set of lighting units $U_{23}$.

According to one possibility, at least one detection unit 16 comprises a goniophotometer and/or a spectroradiometer capable of carrying out a measure of a density of photon flux received at a given wavelength, or on a given wavelength band.

According to one possibility, at least one detection unit 16 comprises a device provided with a spectrometer capable of providing an energy composition of radiation on the photosynthetically active spectrum and/or an apparatus composed of at least one probe, such as a photodetector and/or PARmeter, capable of measuring a quantity of photons received per square meter and per second on a given wavelength band, for example the photosynthetically active band.

From the results of measurements carried out in situ, it is possible, for a lighting system, to establish a relationship between on the one hand the density of photon flux received by a vegetable to be cultivated in each of the wavelength bands and on the other hand the power consumed by each set of lighting units forming part of the installation and each emitting in a given wavelength band. The establishment of such a relationship is useful in order to allow subsequent control of the artificial lighting device with a view to tending to achieve at any time a target energy spectral distribution of the global radiation.

The control unit comprises for example a microcontroller comprising at least one processor, at least one random access memory, at least one read-only memory or storage unit, at least one input-output interface comprising a certain number of input-output ports making it possible in particular to send and/or receive data to and/or from the lighting device.

In particular, the input-output interface allows the control unit to send commands to the lighting device, and in particular to each electric power converter. Furthermore, the input-output interface of the microcontroller makes it possible to receive data from the lighting device, for example relating for example to the electric power consumed by each set of lighting units of the lighting device.

The input-output interface of the microcontroller is also capable of receiving data from the at least one detection unit 16 and from different peripheral units belonging to the control unit or connected to the latter.

According to one possibility, the control unit comprises at least one first determination unit arranged to determine at least one density of photon flux received by the vegetable on at least one wavelength band.

According to one possibility, the control unit comprises at least one first determination unit arranged to determine, based on sunshine models and/or charts, a density of photon flux received by the vegetable on the primary wavelength band and corresponding to the radiation produced by natural lighting.

According to one possibility, the sunshine models and/or charts can be obtained from data provided by specialized software. Such models and/or charts may depend on historical seasonal data, for example, and/or weather forecast. Such models and/or charts make it possible to precisely estimate the level of sunshine, that is to say the density of photon flux produced by solar radiation and received at a geographical location of interest.

According to one possibility, the control unit comprises at least one first determination unit arranged to determine, based on sunshine model or charts, and on each secondary wavelength band, a density of photon flux received by the vegetable and corresponding to the radiation produced by natural lighting.

According to one possibility, the control unit comprises at least one first determination unit arranged to determine, based on sunshine model or charts, on a wavelength band comprising at least the primary wavelength band and each of the secondary bands of the plurality of secondary wavelength bands, the energy spectral distribution of the radiation produced by natural lighting and received by the vegetable.

According to one possibility, the control unit comprises at least one first determination unit arranged to determine, from the electric power consumed by the primary set of lighting units and the photonic efficiency of the primary set of lighting units, the photon flux emitted, in $\mu mol \cdot s^{-1}$, by the primary set of lighting units.

According to one possibility, the control unit comprises at least one first determination unit arranged to determine, from the electric power consumed by the at least one secondary set of lighting units and from the photonic efficiency of said at least one secondary set of lighting units, the photon flux emitted, in $\mu mol \cdot s^{-1}$, by said secondary set of lighting units. Such a determination can be made for each secondary set of lighting units.

According to one possibility, the control unit comprises at least one first determination unit arranged to determine, taking into account the photon flux emitted in $\mu mol \cdot s^{-1}$ by the primary set of lighting units and in particular the distance separating the vegetable from said primary set of lighting units, the density of photon flux in $\mu mol \cdot m^{-2} \cdot s^{-1}$ received by the vegetable in the primary wavelength band and corresponding to the primary radiation produced by the primary set of lighting units.

According to one possibility, the control unit comprises at least one first determination unit arranged to determine, taking into account the photon flux emitted in $\mu mol \cdot s^{-1}$ by the at least one secondary set of lighting units and in particular the distance separating the vegetable from said at least one secondary set of lighting units, the density of photon flux in $\mu mol \cdot m^{-2} \cdot s^{-1}$ received by the vegetable in the emission secondary wavelength band of said at least one secondary set of lighting units and corresponding to the secondary radiation produced by said at least one secondary set of lighting units. Such a determination can be made for each secondary set of lighting units.

The control unit therefore comprises at least one first determination unit capable of establishing a direct relationship between a density of photon flux received by the vegetable in the primary wavelength band and corresponding to the primary radiation produced by the primary set of lighting units and the electric power consumed by the primary set of lighting units.

Similarly, the control unit therefore comprises at least one first determination unit capable of establishing a direct relationship between a density of photon flux received by the vegetable in a secondary wavelength band and corresponding to the secondary radiation produced by the at least one secondary set of lighting units and the electric power consumed by the at least one secondary set of lighting units. Such a relationship can be established for each secondary set of lighting units.

The establishment of such relationships allows efficient control of the primary set of lighting units and each of the secondary sets of lighting units with a view to achieving a precise objective of energy spectral distribution of the radiation produced by the artificial lighting device.

According to one possibility, the control unit comprises at least one first determination unit arranged to determine, based on both: sunshine charts, the electric powers consumed respectively by the primary set of lighting units and each of the secondary sets of lighting units, the respective photonic efficiencies of each primary and secondary set of lighting units and the distance from the vegetable to each set of lighting units, the energy spectral distribution, on a wavelength band comprising at least the primary wavelength band and each secondary wavelength band, of the global radiation resulting from artificial lighting and natural lighting.

According to one possibility, the control unit comprises an obtaining unit arranged to obtain at least one target model of energy spectral distribution of the global radiation received by the vegetable.

According to one possibility, the obtaining unit comprises a second determination unit configured to determine, as a function of at least one parameter, at least one target model of energy spectral distribution of the global radiation received by the vegetable. Said at least one parameter may comprise at least one of the following elements: A development stage of the vegetable, a time of day, an ambient temperature, an absence of natural lighting, a carbon dioxide level in ambient air, an ambient humidity level, a particular development objective, a period of the year.

According to one possibility, at least one target model is stored in at least one storage unit of the control unit.

According to one possibility, the evolution of the target model, or template, is programmed and/or parameterized in advance.

According to one possibility, the control unit comprises at least one human-machine interface allowing at least one user to interact with the control unit of the lighting system. In particular, the human-machine interface allows at least one user to interact with the control unit 13. An authorized user is therefore capable, by means of the human-machine interface, of entering information aimed at controlling the artificial lighting device via the control unit 13.

According to one possibility, a modification can be applied to the target model based on at least one information entered by a user. An authorized user can therefore take control of the lighting system so as to adapt its emission spectrum to a particular specific need.

According to one possibility, the lighting system comprises at least one sensor arranged to capture and/or detect and/or measure at least one environmental data among an ambient temperature and/or a leaf temperature and/or an ambient humidity level and/or a carbon dioxide level in ambient air. Said at least one sensor may comprise a temperature sensor such as a thermometer, and/or a humidity sensor and/or a carbon dioxide sensor.

According to one possibility, a modification can be applied to the target model based on at least one data detected and/or measured and/or captured by said at least one sensor. It is therefore understood that the target model can vary according to different parameters.

According to one possibility, the control unit comprises at least one comparison unit arranged to compare to at least one target model the energy spectral distribution of the global radiation resulting from the combination of natural lighting and artificial lighting.

According to one possibility, the comparison unit is arranged to detect at least one difference between the at least one target model and the energy spectral distribution of the global radiation resulting from the combination of natural lighting and artificial lighting.

The at least one target model of energy spectral distribution of the global radiation, or template, comprises a target primary photon flux density corresponding to the primary wavelength band and, for each secondary wavelength band, a target secondary photon flux density.

The energy spectral distribution of the global radiation received by the vegetable comprises a density of global photon flux received by the vegetable on the primary wavelength band and, for each secondary wavelength band, a density of global photon flux received by the vegetable respectively on each secondary wavelength band.

According to one possibility, the comparison unit is arranged to compare, to the target primary photon flux density defined by the target model, the density of global photon flux received by the vegetable on the primary wavelength band. The comparison unit is also arranged to compare, to a target secondary photon flux density corresponding to a given secondary wavelength band, the density of global photon flux received by the vegetable on said given secondary wavelength band.

According to one possibility, the comparison unit is arranged to determine and/or detect a difference between a target primary photon flux density and the density of global photon flux received by the vegetable on the primary wavelength band. The comparison unit is also arranged to determine and/or detect a difference between a target secondary photon flux density corresponding to a given secondary wavelength band and the density of global photon flux received by the vegetable on said given secondary wavelength band.

According to one possibility, the control unit is configured to determine at least one command aimed at reducing at least one difference detected and/or determined by the comparison unit.

According to one possibility, the control unit is configured to determine a command aimed at reducing a difference detected by the comparison unit taking into account the energy spectral distribution of the radiation produced by the artificial lighting device.

According to one possibility, the comparison unit is arranged to compare to a target primary photon flux density the density of global photon flux received by the vegetable on the primary wavelength band.

According to one possibility, the comparison unit is arranged to compare to a target secondary photon flux density corresponding to a secondary wavelength band the density of global photon flux received by the vegetable on said secondary wavelength band.

FIG. 9 represents an exemplary embodiment of the method for controlling an artificial lighting device according to the disclosure.

In an optional step $E_1$, at least one signal corresponding to radiation produced by a primary set of lighting units and/or at least one secondary set of lighting units is collected, for example by a goniophotometer or a spectroradiometer.

In a step $E_2$, the energy spectral distribution of the radiation produced by the artificial lighting device is obtained, for example from the emission model of the artificial lighting device or from measurements previously carried out establishing a relationship between the power consumed by each set of lighting units composing the artificial lighting device and the density of photon flux received by the vegetable on each primary and secondary wavelength band.

According to another possibility, the step $E_2$ of obtaining the energy spectral distribution of the radiation produced by the artificial lighting device takes into account the at least one signal collected in the optional step $E_1$.

In a step $E_5$, at least one signal corresponding to the global radiation received by the vegetable and resulting from the combination of natural lighting and artificial lighting is collected, for example by a goniophotometer or a spectroradiometer.

In a step $E_6$, an energy spectral distribution of global radiation received by the vegetable and resulting from the combination of artificial lighting and natural lighting is determined. According to the embodiment of [FIG. 9], step $E_6$ of determining the energy spectral distribution of the global radiation takes into account the signal collected in step $E_5$.

In a step $E_8$, at least one target model of energy spectral distribution of the global radiation received by the vegetable is obtained, said target model defining a target photon flux density to be achieved on each of the primary and secondary wavelength bands.

In a step $E_9$, the energy spectral distribution determined in step $E_6$ of the global radiation received by the vegetable is compared to the target model obtained in step $E_8$. The comparison step $E_9$ consists in comparing, for each of the primary and secondary wavelength bands, the photon flux density of the global radiation actually received by the vegetable on a given wavelength band with the photon flux density defined by the target model on this wavelength band. The comparison step $E_9$ therefore makes it possible to detect and determine a possible difference between a density of photon flux received on a primary or secondary wavelength band and the target photon flux density defined by the target model for the corresponding primary or secondary wavelength band.

Finally, in a step $E_{10}$, at least one command intended for the artificial lighting device is determined as a function of the energy spectral distribution of the global radiation determined in step $E_6$, the target model obtained in step $E_8$ and the energy spectral distribution obtained in step $E_2$ of the radiation produced by the artificial lighting device.

The command determined in step $E_{10}$ takes into account the result of the comparison carried out in step $E_9$ between the target model obtained in step $E_8$ and the energy spectral distribution of the global radiation determined in step $E_6$. In particular, the determination of the command carried out in step $E_{10}$ takes into account at least one difference determined in the comparison step $E_9$ between the target model and the energy spectral distribution of the global radiation, the command aimed at reducing said at least one difference.

Finally, said at least one command determined in step $E_{10}$ is sent to the artificial lighting device with a view to modifying the power consumed by at least one of the primary or secondary sets of lighting units.

According to one possibility, the at least one command determined in step $E_{10}$ is intended for at least one of the electric power converters 121, 122, 123 and aims at reducing or increasing the secondary electric power consumed by at least one of the secondary sets of lighting units $U_{21}$, $U_{22}$, $U_{23}$ so as to reduce or increase the quantity of photons emitted per second by said at least one secondary set of lighting units and a fortiori to reduce or increase the density of photon flux produced by artificial lighting and received by the vegetable in the corresponding secondary wavelength band.

According to one possibility, the at least one command determined in step $E_{10}$ is intended for the power supply unit 10 and aims at reducing or increasing the electric power provided by the power supply unit 10 as input to the artificial lighting device, and therefore in particular at reducing or increasing the primary electric power consumed by the primary set of lighting units $U_{11}$, with the consequence of reducing or increasing the quantity of photons emitted per second by the primary set of lighting units and therefore a fortiori the density of photon flux produced by artificial lighting and received by the vegetable in the primary wavelength band.

FIG. 10 is a flowchart representing the control method according to a second embodiment.

In an optional step $E_1$, at least one signal corresponding to radiation produced by a primary set of lighting units and/or to at least one secondary set of lighting units is collected, for example by a goniophotometer or a spectroradiometer.

In a step $E_2$, the energy spectral distribution of the radiation produced by the artificial lighting device is obtained, for example from the emission model of the artificial lighting device or from measurements previously carried out establishing a relationship between the power consumed by each set of lighting units composing the artificial lighting device and the density of photon flux received by the vegetable on each primary and secondary wavelength band.

According to another possibility, the step $E_2$ of obtaining the energy spectral distribution of the radiation produced by the artificial lighting device takes into account the at least one signal collected in the optional step $E_1$.

In an optional step $E_3$, at least one signal corresponding to radiation produced by natural lighting is collected, for example by a goniophotometer or a spectroradiometer.

In a step $E_4$, the energy spectral distribution of the radiation received by the vegetable and produced by natural lighting is obtained. According to one possibility, the energy spectral distribution obtained in step $E_4$ is determined taking into account at least one model of energy spectral distribution of radiation of a natural lighting. Such a model can for example be determined based on sunshine charts or solar calendars.

According to another possibility, the energy spectral distribution obtained in step $E_4$ is obtained taking into account said at least one signal collected in step $E_3$.

In a step $E_6$, the energy spectral distribution of global radiation received by the vegetable and resulting from the combination of artificial lighting and natural lighting is determined. According to the embodiment of [FIG. 10], step $E_6$ of determining the energy spectral distribution of the global radiation takes into account the energy spectral distribution obtained in step $E_2$ of the radiation produced by the artificial lighting device and received by the vegetable and/or the energy spectral distribution obtained in step $E_4$ of the radiation produced by natural lighting.

In a step $E_8$, at least one target model of energy spectral distribution of the global radiation received by the vegetable is obtained, said target model defining a target photon flux density to be achieved on each of the primary and secondary wavelength bands.

In a step $E_9$, the energy spectral distribution determined in step $E_6$ of the global radiation received by the vegetable is compared to the target model obtained in step $E_8$. The comparison step $E_9$ consists in comparing, for each of the primary and secondary wavelength bands, the photon flux density of the global radiation actually received by the vegetable on a given wavelength band with the photon flux density defined by the target model on this wavelength band. The comparison step $E_9$ therefore makes it possible to detect and determine a possible difference between a density of photon flux received on a primary or secondary wavelength band and the target photon flux density defined by the target model for the corresponding primary or secondary wavelength band.

Finally, in step $E_{10}$, at least one command intended for the artificial lighting device is determined as a function of the energy spectral distribution of the global radiation determined in step $E_6$, the target model obtained in step $E_8$ and the energy spectral distribution obtained in step $E_2$ of the radiation produced by the artificial lighting device.

The command determined in step $E_{10}$ takes into account the result of the comparison carried out in step $E_9$ between the target model obtained in step $E_8$ and the energy spectral distribution of the global radiation determined in step $E_6$. In particular, the determination of the command carried out in step $E_{10}$ takes into account at least one difference determined in step $E_9$ of comparison between the target model and the energy spectral distribution of the global radiation, the command aiming at reducing said at least one difference.

Finally, said at least one command determined in step $E_{10}$ is sent to the artificial lighting device with a view to modifying the power consumed by at least one of the primary or secondary sets of lighting units.

According to one possibility, the at least one command determined in step $E_{10}$ is intended for at least one of the electric power converters 121, 122, 123 and aims at reducing or increasing the secondary electric power consumed by at least one of the secondary sets of lighting units $U_{21}$, $U_{22}$, $U_{23}$ so as to reduce or increase the quantity of photons emitted per second by said at least one secondary set of lighting units and a fortiori to reduce or increase the density of photon flux produced by artificial lighting and received by the vegetable in the corresponding secondary wavelength band.

According to one possibility, the at least one command determined in step $E_{10}$ is intended for the power supply unit 10 and aims at reducing or increasing the electric power provided by the power supply unit 10 as input to the artificial lighting device, and therefore in particular at reducing or increasing the primary electric power consumed by the primary set of lighting units $U_{11}$, with the consequence of reducing or increasing the quantity of photons emitted per second by the primary set of lighting units and therefore a fortiori the density of photon flux produced by artificial lighting and received by the vegetable in the primary wavelength band.

The method for controlling an artificial lighting device according to the disclosure makes it possible to continuously adapt the emission spectrum of the artificial lighting device so as to complement natural lighting so that the global radiation received by the vegetable has an energy spectral distribution as close as possible to a target model of energy spectral distribution defining for each primary or secondary wavelength band a target photon flux density allowing optimal development of the vegetable.

The lighting system and its control method make it possible to produce artificial radiation favoring a so-called primary wavelength band over so-called secondary wavelength bands while having a more reasonable electrical energy consumption and a more advantageous energy yield than existing solutions.

The lighting system and its control method make it possible to produce artificial radiation favoring a wavelength band wider and/or more effective than others at the photosynthetic and/or photonic levels without unbalancing the spectrum of the global radiation received by the vegetable.

The lighting system and its control method make it possible to produce artificial radiation making it possible to achieve high electrical efficiency depending on the level of sunshine.

The lighting system and its control method make it possible to produce artificial radiation having an energy spectral distribution which can continually adapt to the particular needs of a vegetable and to environmental conditions, in particular sunshine, thus promoting rapid and correct development of the vegetable throughout the year.

The lighting system and its control method make it possible to continuously modify the energy spectral distribution of the radiation produced by the artificial lighting device without causing significant loss in terms of energy radiated by the device.

In particular, when natural lighting provides photon flux densities of sufficient value on the different secondary wavelength bands, the lighting system and its control method make it possible to produce radiation exclusively located in the primary wavelength band using substantially 100% of the rated electric power provided by the power supply unit, and therefore potentially the maximum rated electric power.

In particular, when natural lighting no longer provides photon flux densities of sufficient value on the different secondary wavelength bands, the lighting system and its control method make it possible to produce sufficient radiation in secondary wavelength bands so as to complement natural lighting while continuing to favor the primary wavelength band.

The lighting system and its control method allow the artificial lighting device to use substantially 100% of the rated electric power provided by the power supply unit, and therefore potentially the maximum rated electric power, regardless of the energy spectral distribution of the radiation produced by the artificial lighting device.

The invention claimed is:

1. A control method for controlling an artificial lighting device arranged to produce radiation intended to promote the development of a vegetable, said device comprising at least:

one primary set of lighting units ($U_{11}$) arranged to produce primary radiation ($R_p$) in a primary wavelength band; and at least one secondary set of lighting units ($U_{21}$, $U_{22}$) arranged to produce secondary radiation ($R_{s21}$, $R_{s22}$) in a secondary wavelength band, the radiation produced by the artificial lighting device resulting from the combination of primary radiation and secondary radiation;

wherein the control method is performed by a control unit and includes the following steps:

obtaining ($E_2$) an energy spectral distribution of the radiation produced by the artificial lighting device and received by the vegetable;

determining ($E_6$), on a wavelength band comprising at least the primary wavelength band and the secondary wavelength band, an energy spectral distribution of global radiation resulting from the combination of artificial lighting and natural lighting received by the vegetable;

obtaining ($E_8$) at least one target model of energy spectral distribution of the global radiation received by the vegetable; and determining ($E_1$) at least one command ($Cmd_1$, $Cmd_2$, $Cmd_3$, $Cmd_4$) intended for the artificial lighting device as a function of the energy spectral distribution of the global radiation, the target model and the energy spectral distribution of the radiation produced by the artificial lighting device.

2. The control method according to claim 1, comprising a step ($E_9$) of comparison between the target model and the energy spectral distribution of the global radiation, the step ($E_{10}$) of determining at least one command taking into account at least one difference between the target model and the energy spectral distribution of the global radiation, the command aimed at reducing said difference taking into account the energy spectral distribution of the radiation produced by the artificial lighting device.

3. The control method according to claim 2, wherein the comparison step ($E_9$) comprises a comparison to a target primary photon flux density of said density of global photon flux received by the vegetable on the primary wavelength band and/or a comparison to a target secondary photon flux density of said density of global photon flux received by the vegetable on the secondary wavelength band.

4. The control method according to claim 1, wherein the step ($E_6$) of determining the energy spectral distribution of the global radiation comprises a determination of a density of global photon flux received by said vegetable on the primary wavelength band and/or a determination of a density of global photon flux received by said vegetable on the secondary wavelength band.

5. The control method according to claim 1, wherein the target model is configured to evolve over time as a function of different parameters, the step of obtaining at least one target model taking into account at least one element among:

a development stage of the vegetable;

one hour of the day;

an ambient temperature;

a leaf temperature;

an absence of natural lighting;

a carbon dioxide level in ambient air; and an ambient humidity level.

6. A lighting system comprising at least:

one control unit;

one artificial lighting device arranged to produce radiation intended to promote the development of a vegetable, said at least one device comprising:

a primary set of lighting units arranged to produce a primary radiation in a primary wavelength band, said primary set being configured to operate with a primary electric power in an electric power range delimited by a maximum consumption primary electric power;

at least one secondary set of lighting units arranged to produce a secondary radiation in a secondary wavelength band, said secondary set being configured to operate with a secondary electric power included in an electric power range delimited by a maximum consumption secondary electric power;

an electric current supply unit arranged to provide a rated electric power included in an electric power range delimited by a maximum supply rated electric power, the power supply unit being configured to supply, in response to at least one command of the control unit, the primary set of lighting units with a primary electric power and the at least one secondary set of lighting units with a secondary electric power;

the maximum consumption primary electric power being included in a value range comprised between 90 and 100% of the maximum supply rated electric power.

7. The lighting system according to claim 6, wherein the maximum consumption primary electric power is greater than the maximum consumption secondary electric power.

8. The lighting system according to claim 6, wherein the primary radiation allows higher photonic efficiency and/or higher photosynthetic efficiency than the secondary radiation.

9. The lighting system according to claim 6, wherein the lighting system comprises at least one electric power converter arranged so as to allow a variation of the secondary electric power.

10. The lighting system according to claim 9, wherein the control unit is arranged to control each electric power converter.

11. The lighting system according to claim 6, wherein the lighting system further comprises:

a plurality of secondary sets of lighting units, each of said secondary sets of lighting units being arranged to produce a secondary radiation in a distinct wavelength band, each of said secondary sets of lighting units being configured to operate with a secondary electric power included in an electric power range delimited by a maximum consumption secondary electric power; and a plurality of electric power converters, each of said electric power converters being arranged so as to allow a variation of the secondary electric power consumed by a distinct secondary set of lighting units.

12. The lighting system according to claim 6, wherein the control unit is arranged to control the power supply unit so as to allow a variation of the rated electric power supplied by the power supply unit.

13. The lighting system according to claim 6, the control unit comprises at least one first determination unit arranged to determine, on a wavelength band comprising at least the primary wavelength band and each secondary wavelength band, an energy spectral distribution of at least one radiation received by the vegetable.

14. The lighting system according to claim 13, wherein the energy spectral distribution of the at least one radiation received by the vegetable comprises a density of photon flux received by the vegetable on the primary wavelength band, and, for each secondary wavelength band, a density of photon flux received by the vegetable on each secondary wavelength band.

15. The lighting system according to claim 13, wherein the at least one radiation received by the vegetable comprises:

a radiation produced by the artificial lighting;

a radiation produced by the natural lighting;

a global radiation resulting from the combination of the artificial lighting and natural lighting.

16. The lighting system according to claim 6, wherein the the lighting system comprises at least one detection unit arranged to perform at least one measurement of a density of photon flux received by the vegetable and produced by at least one radiation on at least one wavelength band.

17. The lighting system according to claim 16, wherein the first determination unit is arranged to determine an energy spectral distribution of at least one radiation received by the vegetable taking into account at least one measurement performed by the at least one detection unit.

18. The lighting system according claim 6, wherein the control unit comprises an obtaining unit arranged to obtain at least one target model of energy spectral distribution of the global radiation received by the vegetable, the obtaining unit comprising at least one second determination unit configured to determine, as a function of at least one parameter, at least one target model of energy spectral distribution of the global radiation received by the vegetable.

19. The lighting system according to claim 18, wherein the control unit comprises a comparison unit arranged to compare the energy spectral distribution of the global radiation to at least one target model, the control unit being configured to determine at least one command taking into account at least one difference between the energy spectral distribution of the global radiation and the at least one target model, said at least one command aiming at reducing said difference taking into account the energy spectral distribution of the radiation produced by the artificial lighting device.

20. The lighting system according to claim 19, wherein the comparison unit is arranged to compare to a target primary photon flux density the global density of photon flux received by the vegetable on the primary wavelength band, and for each secondary wavelength band, to compare to a target secondary photon flux density corresponding to a secondary wavelength band the density of global photon flux received by the vegetable on said secondary wavelength band.

* * * * *